US011815159B2

(12) United States Patent
Nishida et al.

(10) Patent No.: US 11,815,159 B2
(45) Date of Patent: Nov. 14, 2023

(54) WRAPPED V-BELT

(71) Applicant: Mitsuboshi Belting Ltd., Kobe (JP)

(72) Inventors: Shuhei Nishida, Hyogo (JP); Takashi Nishio, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 547 days.

(21) Appl. No.: 17/059,043

(22) PCT Filed: May 21, 2019

(86) PCT No.: PCT/JP2019/020127
§ 371 (c)(1),
(2) Date: Nov. 25, 2020

(87) PCT Pub. No.: WO2019/225608
PCT Pub. Date: Nov. 28, 2019

(65) Prior Publication Data
US 2021/0215228 A1  Jul. 15, 2021

(30) Foreign Application Priority Data

May 25, 2018  (JP) .................................. 2018-100328
Apr. 26, 2019  (JP) .................................. 2019-086123

(51) Int. Cl.
*F16G 5/08* (2006.01)
*B32B 25/02* (2006.01)
*B32B 25/10* (2006.01)

(52) U.S. Cl.
CPC ................ *F16G 5/08* (2013.01); *B32B 25/02* (2013.01); *B32B 25/10* (2013.01);
(Continued)

(58) Field of Classification Search
CPC ....... F16G 5/08; B32B 25/02; B32B 2307/51; B32B 2307/536; B32B 2307/54; B32B 2307/732; B32B 2433/04
(Continued)

(56) References Cited

U.S. PATENT DOCUMENTS 3,995,507 A * 12/1976 White .................. B29D 29/106
474/263
4,869,711 A * 9/1989 Komai ...................... F16G 5/06
474/263

(Continued)

FOREIGN PATENT DOCUMENTS

CN  202301741 U  7/2012
CN  102996709 A  3/2013
(Continued)

OTHER PUBLICATIONS

Dec. 13, 2019—(TW) Office Action—App 108118021.
(Continued)

*Primary Examiner* — Gene O Crawford
*Assistant Examiner* — Emily R Kincaid
(74) *Attorney, Agent, or Firm* — Banner & Witcoff, Ltd.

(57) ABSTRACT

The present invention relates to a wrapped V-belt including: a tension member layer including a tension member; a tension rubber layer laminated on the tension member layer at a belt outer peripheral side; a compression rubber layer laminated on the tension member layer at a belt inner peripheral side; and an outside cloth covering an entire outer surface of the belt, in which the compression rubber layer includes a first compression rubber layer laminated at the belt outer peripheral side and a second compression rubber layer laminated at the belt inner peripheral side, and the tension rubber layer has a rubber hardness that is higher than a rubber hardness of the second compression rubber layer
(Continued)

and lower than a rubber hardness of the first compression rubber layer.

7 Claims, 5 Drawing Sheets

(52) U.S. Cl.
CPC ..... *B32B 2307/51* (2013.01); *B32B 2307/536* (2013.01); *B32B 2307/54* (2013.01); *B32B 2307/732* (2013.01); *B32B 2433/04* (2013.01)

(58) Field of Classification Search
USPC .......................................................... 474/265
See application file for complete search history.

(56) References Cited

U.S. PATENT DOCUMENTS

| | | | | |
|---|---|---|---|---|
| 11,624,421 B2* | 4/2023 | Hamamoto | .......... | D04H 1/4242 474/260 |
| 2005/0245340 A1 | 11/2005 | Ballhausen et al. | | |
| 2018/0080527 A1 | 3/2018 | Imaoka | | |

FOREIGN PATENT DOCUMENTS

| | | | |
|---|---|---|---|
| CN | 205401594 U | | 7/2016 |
| CN | 206257212 U | | 6/2017 |
| CN | 207349362 U | | 5/2018 |
| EP | 774597 A1 | | 5/1997 |
| EP | 3489544 A1 | | 5/2019 |
| JP | S61-286637 A | | 12/1986 |
| JP | H04-138143 U | | 12/1992 |
| JP | H04138143 U | * | 12/1992 |
| JP | H10-238596 A | | 9/1998 |
| JP | 2009-150538 A | | 7/2009 |
| JP | 2010-196888 A | | 9/2010 |
| TW | 378261 B | | 1/2000 |
| TW | 201805545 A | | 2/2018 |
| WO | 2016-175265 A1 | | 11/2016 |

OTHER PUBLICATIONS

Jul. 9, 2019—International Search Report—Intl App PCT/JP2019/020127.
Oct. 8, 2021—(CN) Notification of First Office Action—App 201980034876.9.
Jun. 16, 2022—(KR) Office Action—App 10-2020-7033371.

* cited by examiner

[FIG. 1]
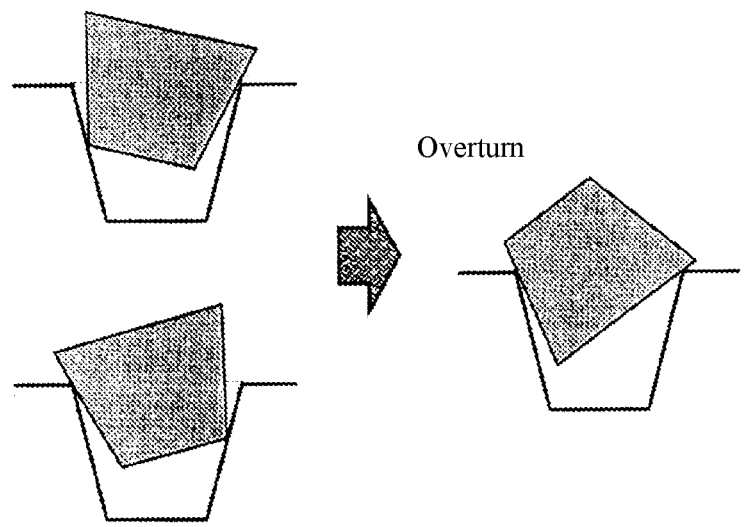
[FIG. 2]
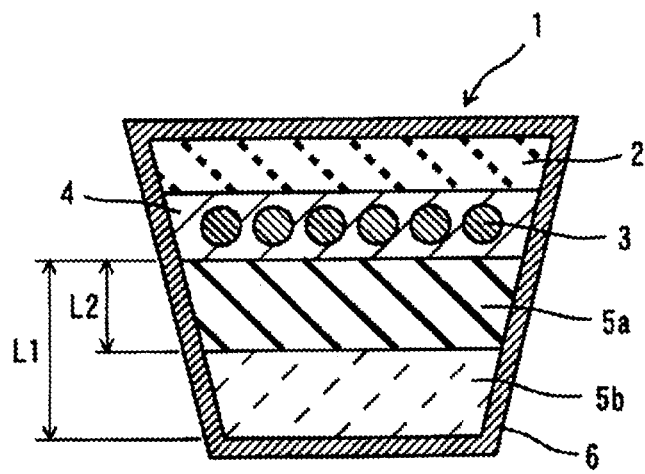
[FIG. 3]
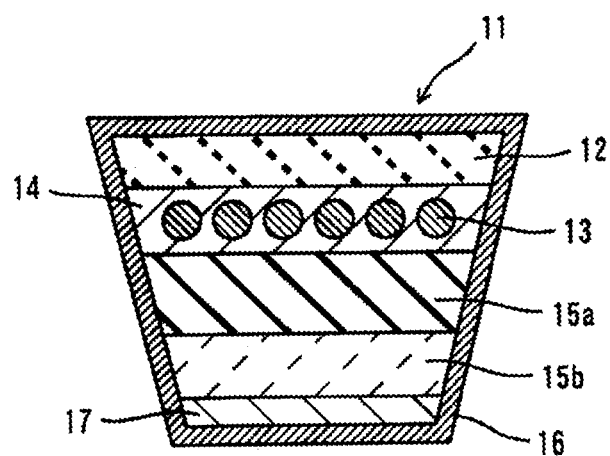

[FIG. 4]
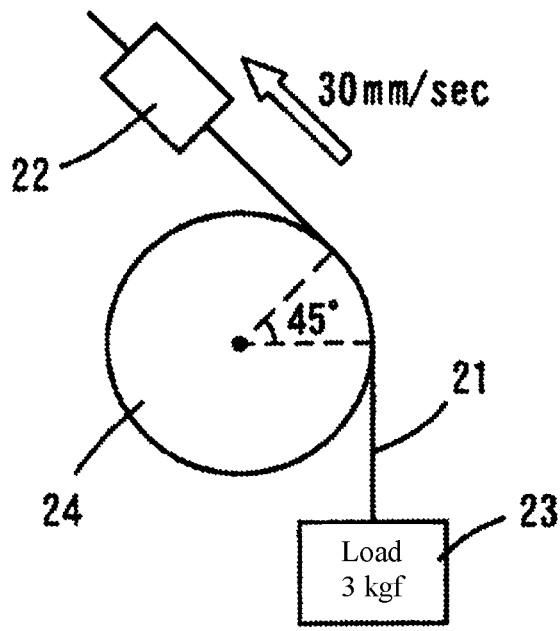
[FIG. 5]
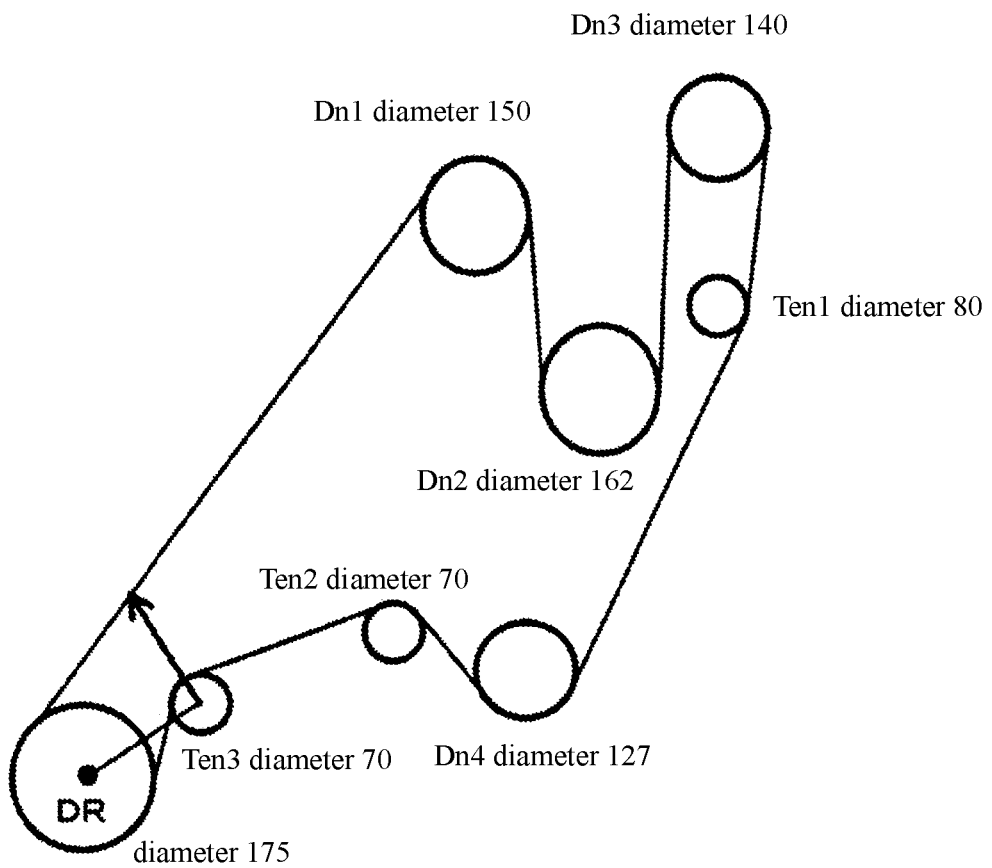

[FIG. 6]
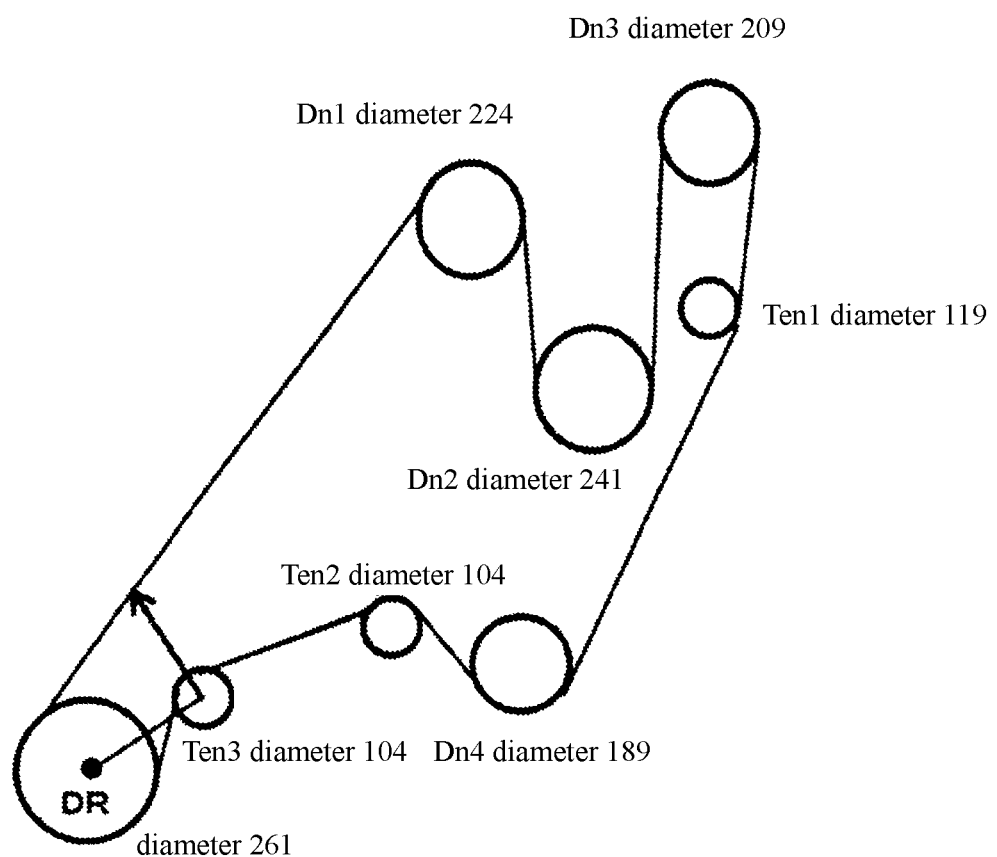

[FIG. 7]
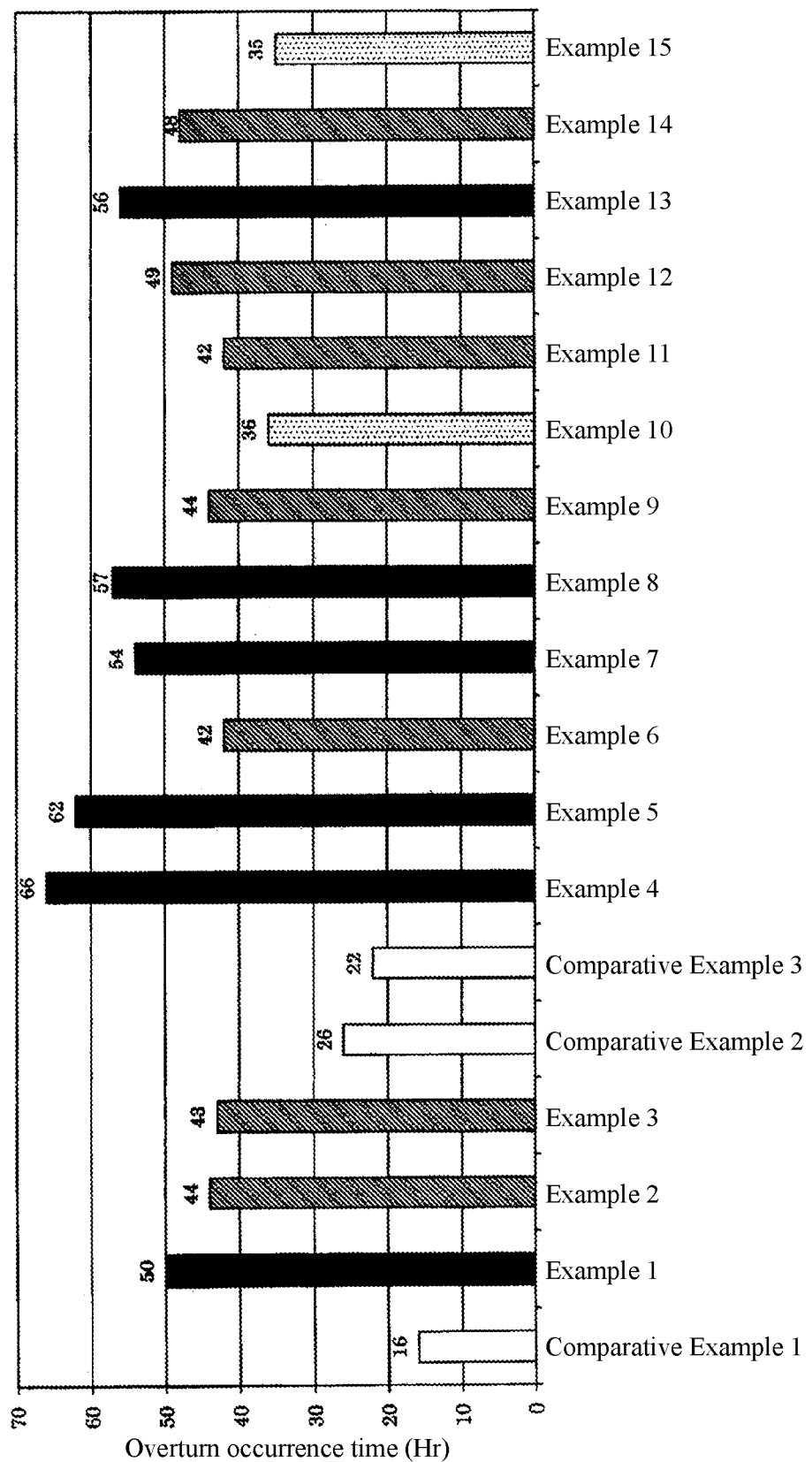

[FIG. 8]
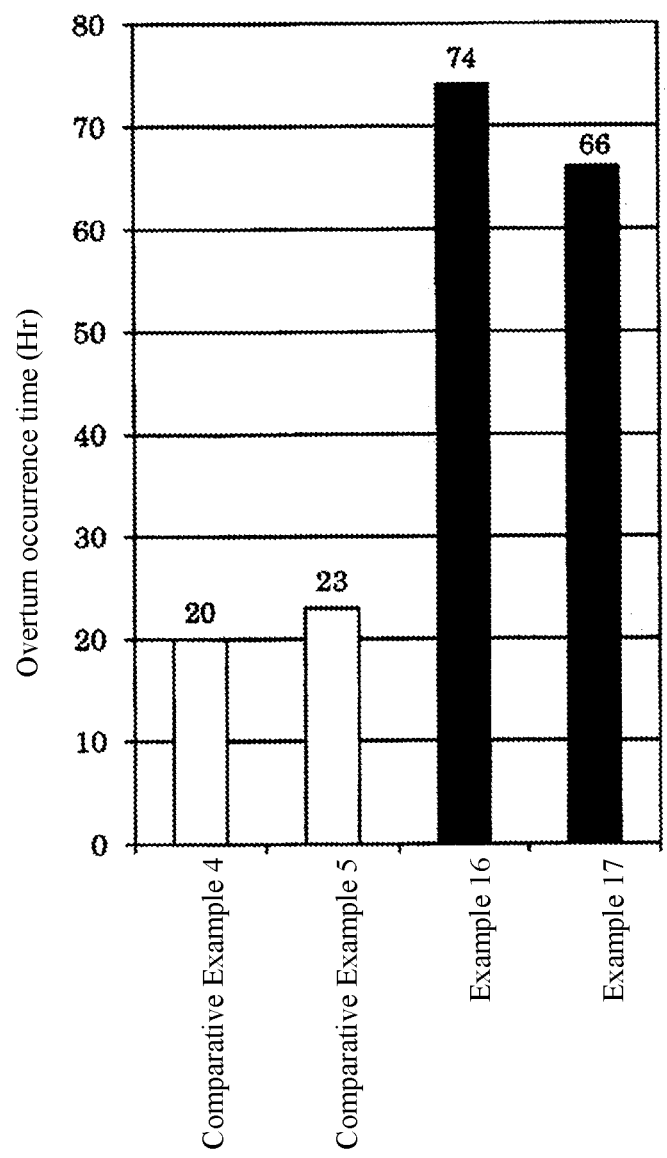

WRAPPED V-BELT

CROSS REFERENCE TO RELATED APPLICATIONS

This is a U.S. National Phase Application under 35 U.S.C. § 371 of International Application No. PCT/JP2019/020127, filed May 21, 2019, which claims priority to Japanese Application Nos. 2018-100328, filed May 25, 2018, and 2019-086123, filed Apr. 26, 2019, which was published Under PCT Article 21(2), the entire contents of which are incorporated herein by reference.

TECHNICAL FIELD

The present invention relates to a wrapped V-belt having a frictional power transmission surface formed to be inclined in a V shape and used in a multi-shaft layout.

BACKGROUND ART

Examples of V-belts for transmitting power by frictional power transmission include a raw-edge type (Raw-Edge V-belt) whose frictional power transmission surface is an exposed rubber layer, and a wrapped type (Wrapped V-belt) whose frictional power transmission surface (V-shaped side surface) is covered with a cover cloth, and they are used appropriately in accordance with the application due to a difference in surface properties of the frictional power transmission surface (coefficients of friction of the rubber layer and the cover cloth). These V-belts are used in a wide range of fields such as automobiles and industrial machines, and are used under high load due to an increase in power transmission capacity and an increase in size of the device. Therefore, in order to prevent buckling deformation (dishing), the V-belt is required to have increased rigidity (lateral pressure resistance) in a belt width direction.

For example, the following Patent Literatures 1 to 3 propose frictional power transmission belts that are devised to improve the lateral pressure resistance. Generally, in order to ensure the lateral pressure resistance, a rubber composition having a large mechanical property, reinforced by blending short fibers or the like is used for a compression rubber layer and a tension rubber layer.

JP-A-H10-238596 (Patent Literature 1) discloses a power transmission belt including an adhesion rubber layer embedded with a cord, a tension rubber layer and a compression rubber layer laminated via the adhesion rubber layer, and a fabric layer laminated on at least one of the tension rubber layer and the compression rubber layer, having both side surfaces on which each rubber layer is exposed, and having a bottom surface formed in a cog shape, in which the rubber hardness of at least one of the tension rubber layer and the compression rubber layer is set in a range of 90 to 96°, the rubber hardness of the adhesion rubber layer is set in a range of 83 to 89°, and aramid short fibers are oriented in the tension rubber layer and the compression rubber layer in the belt width direction to improve the lateral pressure resistance.

In addition, JP-A-2009-150538 (Patent Literature 2) discloses a cogged V-belt in which the rubber hardness of a tension rubber layer is set in a range of from 85 to 92, the rubber hardness of the compression rubber layer is set in a range of from 90 to 98, and the rubber hardness of the compression rubber layer is from 3 to 10 or more than the rubber hardness of the tension rubber layer. The cogged V-belt prevents dishing even under a high load transmission, prevents separation of the belt between above and below at a portion where a cord is embedded, prevents the cord from jumping out, and has bendability of the belt.

Furthermore, JP-A-2010-196888 (Patent Literature 3) discloses a power transmission belt in which a compression rubber layer includes at least two layers of an upper layer near a cord and a lower layer on an inner peripheral surface side of the belt, and the hardness of the upper layer is set higher than that of the lower layer (the hardness of the upper layer is in a range of from 93 to 99, and the hardness of the lower layer is in a range of from 80 to 88). This literature discloses that the upper layer with high hardness can improve deformation resistance of the belt, and since rubber with low hardness is disposed in the lower layer of the belt, which undergoes the greatest stress and is greatly deformed when the belt is bent, bending fatigue resistance can be excellent and cracks can be made less likely to occur.

In a threshing apparatus installed in a combine harvester, which represents agricultural machinery, a multi-shaft layout is adopted in which a single long V-belt is stretched over a drive shaft that works together with an engine and a plurality of work shafts. The stretched long V-belt is often used under severe running conditions in which continuous bending involving not only forward bending but also reverse bending is repeated.

In this use application, a wrapped V-belt in which the entire surface of the belt including the frictional power transmission surface is covered with a cover cloth in the whole circumference is used. The reason is that, in the case where a raw-edge V-belt whose frictional power transmission surface is an exposed rubber layer is used, there is a concern that the coefficient of friction of the power transmission surface is high and the stress applied to the belt is large, which may lead to early cutting, or the rubber may be damaged by exhausted straws entangled in the belt. In the case of using a wrapped V-belt, the coefficient of friction of the power transmission surface is reduced, and the stress on the belt is reduced due to an appropriate slip. In addition, the power transmission surface is protected and is less likely to be damaged.

In recent years, the horsepower of the apparatus has been increased (the load (reference power transmission capacity) applied per belt is 8 PS or more), and the stress applied to a belt has increased. In the conventional wrapped V-belt, since the lateral pressure resistance is insufficient, buckling deformation (dishing) may occur due to lateral pressure from the pulley, and self-heating (internal loss due to heat generation) due to the deformation may occur. When the buckling deformation is excessive, the shear stress generated from the inside of the V-belt may be concentrated near the cord layer (an interface between the cord and the adhesion rubber layer or an interface between the adhesion rubber layer and the compression rubber layer) to cause interface separation. Furthermore, the rubber may be deteriorated due to the self-heating due to the deformation, and the adhesive force between the cord and the rubber may be reduced, leading to a separation of the cord. As a result, since the tension of each cord arranged in the belt width direction becomes uneven during the running, as illustrated in FIG. 1, when the belt loses balance during the running, there is a concern that the belt runs at an inclination and eventually overturns (inverts)

Therefore, product design for the wrapped V-belt is needed, which is suitable for a multi-shaft layout in which a long V-belt is used and continuous bending together with reverse bending is repeated, and which can ensure lateral pressure resistance that can be applied to high horsepower (8 PS or more per belt).

Since the frictional power transmission belts in Patent Literatures 1 to 3 capable of improving the lateral pressure resistance are short V-belts that are used in belt type transmissions for vehicles such as scooters and automobiles or for machines for general industry and are used in a two-shaft layout, and are not for applications in which overturn of the belt is a concern, they are not product designs in consideration of overturn prevention. In addition, since they are designs for a raw-edge V-belt, it is necessary to consider the difference in coefficient of friction. Therefore, the techniques of Patent Literatures 1 to 3 cannot be simply applied to the above-mentioned product design, and a new product design is required.

CITATION LIST

Patent Literature

[Patent Literature 1] JP-A-H10-238596 (claim 1 and paragraph [0008])
[Patent Literature 2] JP-A-2009-150538 (claim 1 and paragraph [0010])
[Patent Literature 3] JP-A-2010-196888 (claim 1 and paragraphs [0013] and [0025])

SUMMARY OF INVENTION

Technical Problem

Therefore, an object of the present invention is to provide a wrapped V-belt capable of preventing overturn even when used in an application that is a multi-shaft layout in which continuous bending together with reverse bending is repeated, and that requires high horsepower of 8 PS or more per belt (severe multi-shaft layout applications).

Another object of the present invention is to provide a wrapped V-belt having excellent lateral pressure resistance and capable of improving durability even when used in severe multi-shaft layout applications.

Solution to Problem

As a result of earnest study to achieve the above-mentioned problems, the present inventors have found that, in a wrapped V-belt including a tension member layer including a tension member, a tension rubber layer laminated on the tension member layer at a belt outer peripheral side, a compression rubber layer laminated on the tension member layer at an inner peripheral side, and an outside cloth, when constituting the compression rubber layer with a first compression rubber layer laminated at the belt outer peripheral side and a second compression rubber layer laminated at the belt inner peripheral side, and adjusting the rubber hardness of each layer such that the rubber hardness increases in the order of the second compression rubber layer, the tension rubber layer and the first compression rubber layer, overturn can be prevented even when the wrapped V-belt is used in an application that is a multi-shaft layout in which continuous bending together with reverse bending is repeated, and that requires high horsepower of 8 PS or more per belt. Based thereon, they completed the present invention.

That is, a wrapped V-belt according to the present invention includes: a tension member layer including a tension member; a tension rubber layer laminated on the tension member layer at a belt outer peripheral side; a compression rubber layer laminated on the tension member layer at a belt inner peripheral side; and an outside cloth covering an entire outer surface of the belt, in which the compression rubber layer includes a first compression rubber layer laminated at the belt outer peripheral side and a second compression rubber layer laminated at the belt inner peripheral side, and the tension rubber layer has a rubber hardness that is higher than a rubber hardness of the second compression rubber layer and lower than a rubber hardness of the first compression rubber layer. The first compression rubber layer may have an average thickness of from 90% to 50% with respect to an average thickness of the entire compression rubber layer. The tension rubber layer may have a rubber hardness Hs (JIS A) in a range of from 85° to 90°, the first compression rubber layer may have a rubber hardness Hs (JIS A) in the range of from 90° to 95°, and the second compression rubber layer may have a rubber hardness Hs (JIS A) in the range of from 72° to 80°. A difference in rubber hardness Hs (JIS A) between the first compression rubber layer and the second compression rubber layer may be from 12° to 21°. A difference in rubber hardness Hs (JIS A) between the first compression rubber layer and the tension rubber layer may be from 3° to 10° (particularly 3° to 5°). The tension rubber layer may have a tensile elastic modulus (modulus) in a belt width direction in accordance with JIS K6251 (1993) being from 17 MPa to 28 MPa, the first compression rubber layer may have a tensile elastic modulus (modulus) in the belt width direction in accordance with JIS K6251 (1993) being from 30 MPa to 40 MPa, and the second compression rubber layer may have a tensile elastic modulus (modulus) in the belt width direction in accordance with JIS K6251 (1993) being from 13 MPa to 18 MPa. The outside cloth serving as a power transmission surface may have a coefficient of friction of from 0.91 to 0.96. A reinforcing cloth layer may be interposed between an inner peripheral surface of the compression rubber layer and the outside cloth.

Advantageous Effects of Invention

In the present invention, in the wrapped V-belt including a tension member layer including a tension member, a tension rubber layer laminated on the tension member layer at the belt outer peripheral side, a compression rubber layer laminated on the tension member layer at the inner peripheral side, and an outside cloth, the compression rubber layer includes at least a first compression rubber layer laminated at the belt outer peripheral side and a second compression rubber layer laminated at the belt inner peripheral side, and the rubber hardness of each layer is adjusted such that the rubber hardness increases in the order of the second compression rubber layer, the tension rubber layer and the first compression rubber layer. Therefore, even when the wrapped V-belt is used in a severe multi-shaft layout application, overturn can be prevented. Furthermore, the lateral pressure resistance can be improved, and the durability can be improved even when the wrapped V-belt is used in a severe multi-shaft layout application.

BRIEF DESCRIPTION OF DRAWINGS

FIG. 1 includes schematic cross-sectional views illustrating a state where a wrapped V-belt is running while inclining and a state where the wrapped V-belt is overturned.

FIG. 2 is a schematic cross-sectional view of an example of a wrapped V-belt according to the present invention.

FIG. 3 is a schematic cross-sectional view of another example of the wrapped V-belt according to the present invention.

FIG. 4 is a schematic diagram for explaining a method of measuring a coefficient of friction in Examples.

FIG. 5 is a schematic diagram for explaining a running test of JIS B type wrapped V-belts obtained in Examples and Comparative Examples.

FIG. 6 is a schematic diagram for explaining a running test of JIS C type wrapped V-belts obtained in Examples and Comparative Examples.

FIG. 7 is a graph showing results of an overturn prevention property of the JIS B type wrapped V-belts obtained in Examples and Comparative Examples.

FIG. 8 is a graph showing results of an overturn prevention property of the JIS C type wrapped V-belts obtained in Examples and Comparative Examples.

DESCRIPTION OF EMBODIMENTS

Hereinafter, the present invention will be described in detail with reference to the accompanying drawings as necessary.

The wrapped V-belt according to the present invention may be a common wrapped V-belt, except that a compression rubber layer has a laminated structure including two types of compression rubber layers having different rubber hardness and the rubber hardness of each layer is adjusted. The common wrapped V-belt may be a V-belt which includes, for example, a belt body having an endless V-shaped cross section and including a compression rubber layer at an inner peripheral side, a tension rubber layer at an outer peripheral side, and a tension member layer (adhesion rubber layer) interposed therebetween and embedded with a cord, and an outside cloth (cover cloth) covering a periphery of the V-shaped cross section of the belt body over the entire length in a circumferential length direction of the belt, and in which left and right side surfaces of the V-shaped cross section covered with the outside cloth serve frictional power transmission surfaces. In the V-shaped cross section, a side where the belt width is wide is the outer peripheral side, and a side where the belt width is narrow is the inner peripheral side.

FIG. 2 is a schematic cross-sectional view of an example of the wrapped V-belt according to the present invention. A wrapped V-belt 1 illustrated in FIG. 2 includes an endless belt body in which a tension rubber layer (or upper core rubber layer) 2, a tension member layer (adhesion rubber layer) 4 with tension members 3 embedded in a vulcanized rubber composition, a first compression rubber layer (first V-core rubber layer) 5a, and a second compression rubber layer (second V-core rubber layer) 5b are successively laminated from the belt outer peripheral side, and an outside cloth 6 (a woven fabric, a knitted fabric, a non-woven cloth, etc.) covering the periphery of the belt body over the entire length in the circumferential length direction of the belt. In this example, the tension members 3 are cords (twisted cords) arranged at a predetermined interval in the belt width direction. In addition, in this example, the tension member layer 4 is formed of a vulcanized rubber composition in which the tension members 3 are embedded. Alternatively, the tension member layer may be formed only of the tension members 3 arranged at an interface between the tension rubber layer and the compression rubber layer. In the present description and claims, in the case where the tension member layer is formed only of the tension member, tension members arranged at intervals in the belt body are called a tension member layer. Such a tension member layer not only includes a form in which the tension members are arranged at the interface between the tension rubber layer and the compression rubber layer, but also includes a form in which a part or all of the tension members arranged at the interface between the tension rubber layer and the compression rubber layer are embedded in the tension rubber layer or in the compression rubber layer during a production process.

The wrapped V-belt according to the present invention is a belt capable of preventing overturn peculiar in a multi-shaft layout (e.g., layouts illustrated in FIGS. 5 and 6 in an evaluation test of Examples to be described later) in which continuous bending together with reverse bending is repeated. That is, in a state where the wrapped V-belt is wound around each pulley and bent, the rubber layer at the outer peripheral side undergoes extension deformation and the rubber layer at the inner peripheral side undergoes compression deformation along with the bending. In the case where the wrapped V-belt is wound by reverse bending, the relationship between the outer peripheral side and the inner peripheral side is reversed. In any case, in the case where a rubber composition difficult to deform (extend or compress) is used for the rubber layer at the outer peripheral side or at the inner peripheral side, the bendability is lowered. As a result, winding property to the pulley is lowered, then, it becomes difficult for the belt to fit in a V groove of the pulley, and the overturn easily occurs during running On the other hand, in the case where a flexible rubber composition which is easily deformed is used for giving priority to bendability (fitting property to the pulley), lateral pressure resistance against the pulley is lowered. As a result, since the lowered lateral pressure resistance leads to an increase in the buckling deformation, the overturn easily occurs, too. From these viewpoints, in this application, the balance between bendability (fitting property to the pulley) and lateral pressure resistance is important, and as a design concept, an important point is that the hardness and strength of a central layer (first compression rubber layer) in a thickness direction of the belt should be as high as possible, and the hardness of the tension rubber layer and the second compression rubber layer, which are layers at the outer peripheral side or the inner peripheral side, is adjusted within an appropriate range (not too high nor too low). In particular, it is difficult to balance the bendability and the lateral pressure resistance, which are contradictory properties. However, the present invention has succeeded in improving the overturn prevention property by adjusting the rubber hardness of each layer.

In the wrapped V-belt according to the present invention, the width of the outer peripheral surface of the belt may be, for example, from 15 mm to 35 mm (particularly 16 mm to 25 mm), and the thickness of the wrapped V-belt may be, for example, from 10 mm to 20 mm (particularly 10 mm to 15 mm).

[Compression Rubber Layer]

In the present invention, the compression rubber layer has a laminated structure of two or more layers including a first compression rubber layer laminated at the belt outer peripheral side and a second compression rubber layer laminated at the belt inner peripheral side and having a rubber hardness lower than that of the first compression rubber layer. Since the rubber hardness of the tension rubber layer is adjusted to be lower than that of the first compression rubber layer and higher than that of the second compression rubber layer, the side resistance of the belt can be improved.

The compression rubber layer may have a laminated structure of three or more layers as long as it includes the first compression rubber layer and the second compression rubber layer, and preferably has a two-layer structure consisting of the first compression rubber layer and the second compression rubber layer, from the viewpoints of lateral pressure resistance, productivity and the like.

The rubber hardness of the first compression rubber layer is higher than the rubber hardness of both the second compression rubber layer and the tension rubber layer, and the difference in rubber hardness Hs (JIS A) between the first compression rubber layer and the tension rubber layer (the rubber hardness of the first compression rubber layer—the rubber hardness of the tension rubber layer) may be about, for example, 1° or more, preferably from 1° to 10° (e.g., 3° to 10°), more preferably from 2° to 7° (e.g., 2° to 5°), and still more preferably from 3° to 5° (particularly 3° to 4°). In the case where the difference in rubber hardness between the two layers is too small, the overturn prevention property in a severe multi-shaft layout application may be lowered, and also in the case where the difference is too large, the overturn prevention property may be lowered.

The rubber hardness Hs of the first compression rubber layer can be selected from the range of about, for example, from 80° to 100°, and is preferably from 90° to 95°, more preferably from 91° to 95°, and still more preferably from 92° to 94°. In the case where the rubber hardness is too small, the lateral pressure resistance may be lowered, and in the case where the rubber hardness is too large, the hardness is too high, and the fitting property to the pulley groove may be lowered.

The second compression rubber layer has a rubber hardness smaller than that of both the first compression rubber layer and the tension rubber layer, and the difference in rubber hardness Hs between the first compression rubber layer and the second compression rubber layer (the rubber hardness of the first compression rubber layer—the rubber hardness of the second compression rubber layer) is about, for example, 1° or more (particularly 5° or more), preferably from 5° to 30° (e.g., 7° to 27°), more preferably from 10° to 25° (e.g., 12° to 21°), still more preferably from 12° to 20° (particularly 15° to 20°), and most preferably from 16° to 18°. The difference in rubber hardness Hs between the tension rubber layer and the second compression rubber layer (the rubber hardness of the tension rubber layer—the rubber hardness of the second compression rubber layer) is about, for example, from 5° to 30° (e.g., 7° to 25°), preferably from 10° to 20° (e.g., 12° to 18°), and more preferably from 13° to 15°. In the case where the difference in rubber hardness between the second compression rubber layer and the first compression rubber layer or the tension rubber layer is too small, the overturn prevention property in a severe multi-shaft layout application may be lowered, and also in the case where the difference is too large, the overturn prevention property may be lowered.

The rubber hardness Hs of the second compression rubber layer can be selected from the range of about, for example, from 60° to 90°, and is preferably from 72° to 80°, more preferably from 73° to 78°, and still more preferably from 75° to 77°. In the case where the rubber hardness is too small, the lateral pressure resistance may be lowered, and in the case where the rubber hardness is too large, the hardness is too high, and the fitting property to the pulley groove may be lowered.

In the present description and claims, the rubber hardness of each rubber layer indicates the value Hs (JIS A) measured in accordance with the spring hardness test (A type) specified in JIS K6253 (2012) (vulcanized rubber and thermoplastic rubber—hardness determination method—), and may be simply referred to as rubber hardness.

The tensile elastic modulus (modulus) of the first compression rubber layer is about, for example, from 25 MPa to 50 MPa, preferably from 30 MPa to 40 MPa, and more preferably from 35 MPa to 40 MPa in the belt width direction. In the case where the tensile elastic modulus is too small, the lateral pressure resistance may be lowered, and in the case where the tensile elastic modulus is too large, the hardness is too high, and the fitting property to the pulley groove may be lowered.

The tensile elastic modulus (modulus) of the second compression rubber layer is about, for example, from 12 MPa to 20 MPa, preferably from 13 MPa to 18 MPa, and more preferably from 14 MPa to 17 MPa in the belt width direction. In the case where the tensile elastic modulus is too small, the lateral pressure resistance may be lowered, and in the case where the tensile elastic modulus is too large, the hardness is too high, and the fitting property to the pulley groove may be lowered.

In the present description and claims, the tensile elastic modulus (modulus) of each rubber layer can be measured by a method in accordance with JIS K6251 (1993).

The average thickness of the entire compression rubber layer is about, for example, from 1 mm to 12 mm, preferably from 2 mm to 10 mm, and more preferably from 2.5 mm to 9 mm (particularly 3 mm to 5 mm).

The average thickness of the first compression rubber layer can be selected from the range of about, for example, from 95% to 30%, and is preferably from 90% to 50%, more preferably from 85% to 55%, and still more preferably 80% to 60% (particularly 75% to 70%), with respect to the average thickness of the entire compression rubber layer. This proportion may be a proportion in the case where the compression rubber layer includes only the first compression rubber layer and the second compression rubber layer (i.e., L2/L1 in FIG. 2). In the case where the proportion of the thickness of the first compression rubber layer is too small, the lateral pressure resistance may be lowered, and in the case where the proportion is too large, the hardness is too high, and the fitting property to the pulley groove may be lowered.

The compression rubber layer may further contain another compression rubber layer having different rubber hardness in addition to the first compression rubber layer and the second compression rubber layer. The other compression rubber layer may be a single layer or a plurality of layers. The other compression rubber layer may be laminated on either an upper or lower surface of the first compression rubber layer or on a lower surface of the second compression rubber layer. The average thickness of the other compression rubber layer may be, for example, 30% or less, preferably 10% or less, and more preferably 5% or less, with respect to the average thickness of the entire compression rubber layer. That is, the compression rubber layer preferably includes the first compression rubber layer and the second compression rubber layer as main layers, and the total average thickness of the first compression rubber layer and the second compression rubber layer may be, for example, 70% or more, preferably 90% or more, and more preferably 95% with respect to the average thickness of the entire compression rubber layer. The compression rubber layer particularly preferably includes only the first compression rubber layer and the second compression rubber layer.

The compression rubber layer may be formed of a vulcanized rubber composition commonly used as a rubber composition of a wrapped V-belt. The vulcanized rubber composition may be a vulcanized rubber composition containing a rubber component, and when the composition of the vulcanized rubber composition is appropriately adjusted, it is possible to adjust the rubber hardness or the like of each layer constituting the compression rubber layer, particularly the first compression rubber layer and the second compression rubber layer. The method for adjusting the rubber hardness or the like is not particularly limited. The rubber hardness or the like may be adjusted by changing the composition and/or type of components constituting the vulcanized rubber composition, and is preferably adjusted by changing the proportion and/or type of short fibers and fillers, from the viewpoint of simplicity.

(First Compression Rubber Layer)

(A) Rubber Component

The rubber component constituting the vulcanized rubber composition forming the first compression rubber layer can be selected from known vulcanizable or crosslinkable rubbers and/or elastomers. Examples thereof include: diene rubbers (natural rubber, isoprene rubber, butadiene rubber, chloroprene rubber (CR), styrene butadiene rubber (SBR), vinyl pyridine-styrene-butadiene copolymer rubber, and acrylonitrile butadiene rubber (nitrile rubber); hydrogenated products of the above-mentioned diene rubbers such as hydrogenated nitrile rubber (including mixed polymer of hydrogenated nitrile rubber and an unsaturated carboxylic acid metal salt), etc.), olefin rubbers (e.g., ethylene-α-olefin rubber (ethylene-α-olefin elastomer), polyoctenylene rubber, ethylene-vinyl acetate copolymer rubber, chlorosulfonated polyethylene rubber, alkylated chlorosulfonated polyethylene rubber, etc.), epichlorohydrin rubber, acrylic rubber, silicone rubber, urethane rubber, fluororubber, and the like. These rubber components can be used alone or in combination of two or more thereof.

Among these, from the viewpoint that a vulcanizing agent and a vulcanization accelerator easily disperse, ethylene-α-olefin elastomers (ethylene-α-olefin rubbers such as ethylene-propylene copolymer (EPM) and ethylene-propylene-diene terpolymer (EPDM)) and chloroprene rubber are widely used. In particular, in the case of being used in a high load environment such as a variable speed belt, chloroprene rubber and EPDM are preferred from the viewpoint of excellent balance of mechanical strength, weather resistance, heat resistance, cold resistance, oil resistance, adhesiveness and the like. Furthermore, chloroprene rubber is particularly preferred because of having excellent abrasion resistance in addition to the above-mentioned properties. The chloroprene rubber may be a sulfur-modified type or a non-sulfur-modified type.

In the case where the rubber component contains chloroprene rubber, the proportion of the chloroprene rubber in the rubber component may be 50% by mass or more (particularly from about 80 to 100% by mass), and particularly preferably 100% by mass (chloroprene rubber only).

(B) Short Fibers

The vulcanized rubber composition may further contain short fibers in addition to the rubber component. Examples of the short fibers include: synthetic fibers such as polyolefin fibers (e.g., a polyethylene fiber and a polypropylene fiber), polyamide fibers (e.g., a polyamide 6 fiber, a polyamide 66 fiber, a polyamide 46 fiber, and an aramid fiber), polyalkylene arylate fibers (e.g., $C_{2-4}$ alkylene $C_{8-14}$ arylate fibers such as a polyethylene terephthalate (PET) fiber, a polytrimethylene terephthalate (PTT) fiber, a polybutylene terephthalate (PBT) fiber, and a polyethylene naphthalate (PEN) fiber), vinylon fibers, polyvinyl alcohol fibers, and polyparaphenylene benzobisoxazole (PBO) fibers; natural fibers such as cotton, hemp and wool; inorganic fibers such as carbon fibers; and the like. These short fibers can be used alone or in combination of two or more thereof.

Among these short fibers, synthetic fibers and natural fibers, particularly synthetic fibers such as polyester fibers (polyalkylene arylate fibers) containing, as a main constituent unit, $C_{2-4}$ alkylene $C_{6-12}$ arylates such as ethylene terephthalate and ethylene-2,6-naphthalate and polyamide fibers (an aramid fiber, etc.), and inorganic fibers such as a carbon fiber are widely used. Among these, preferred are rigid, high strength and modulus fibers such as polyester fibers (particularly a polyethylene terephthalate fiber and a polyethylene naphthalate fiber) and polyamide fibers (particularly an aramid fiber). The aramid fiber also has high abrasion resistance. Therefore, the short fibers preferably contain at least wholly aromatic polyamide fibers such as an aramid fiber. The aramid fiber may be a commercially available product such as trade name "Conex", "Nomex", "Kevlar", "Technora", "Twaron".

The average fiber diameter of the short fibers is about, for example, 2 μm or more, preferably from 2 μm to 100 μm, more preferably from 3 μm to 50 μm (e.g., 5 μm to 50 μm), and still more preferably from 7 μm to 40 μm (particularly 10 μm to 30 μm). The average length of the short fibers is about, for example, from 1 mm to 20 mm, preferably from 1.5 mm to 10 mm, and more preferably from 2 mm to 5 mm (particularly 2.5 mm to 4 mm).

From the viewpoint of dispersibility and adhesiveness of the short fibers in the rubber composition, the short fibers may be subjected to an adhesion treatment (or surface treatment) by a common method. Examples of the surface treatment method include a method of treating with a treatment liquid containing a common surface treatment agent. Examples of the surface treatment agent include an RFL liquid containing resorcin (R), formaldehyde (F) and rubber or latex (L) (e.g., an RFL liquid containing a condensate (RF condensate) formed by resorcin (R) and formaldehyde (F), and the above-described rubber component such as vinylpyridine-styrene-butadiene copolymer rubber), an epoxy compound, a polyisocyanate compound, a silane coupling agent, a vulcanizable rubber composition (e.g., a vulcanizable rubber composition containing a wet-process white carbon that has a surface silanol group and contains hydrated silicic acid as a main component, which is advantageous for enhancing chemical bonding force with rubber, and the like, etc.), and the like. These surface treatment agents may be used alone or in combination of two or more thereof, and short fibers may be sequentially treated with the same or different surface treatment agents for a plurality of times.

The short fibers may be embedded in the compression rubber layer while being oriented in the belt width direction in order to suppress the compression deformation of the belt due to the pressure from the pulley.

The proportion of the short fibers is about, for example, from 5 to 50 parts by mass, preferably from 10 to 30 parts by mass, and more preferably from 15 to 25 parts by mass (particularly 18 to 22 parts by mass), with respect to 100 parts by mass of the rubber component. In the case where the proportion of the short fibers is too small, the rubber hardness of the first compression rubber layer may be lowered, and in the case where the proportion is too large, the hardness is too high, and the fitting property to the pulley groove may be lowered.

(C) Filler

The vulcanized rubber composition may further contain a filler in addition to the rubber component. Examples of the filler include carbon black, silica, clay, calcium carbonate, talc, mica, and the like. The filler often contains a reinforcing filler, and such a reinforcing filler may be carbon black, reinforcing silica or the like. Generally, the reinforcing ability of silica is smaller than that of carbon black. These fillers can be used alone or in combination of two or more thereof. In the present invention, in order to improve the lateral pressure resistance, it is preferable to contain a reinforcing filler, and it is particularly preferable to contain carbon black.

The average particle diameter (number average primary particle diameter) of carbon black is about, for example, from 5 nm to 200 nm, preferably from 10 nm to 150 nm, and more preferably from 15 nm to 100 nm, and from the viewpoint of a high reinforcing effect, may be small, for example, about from 5 nm to 38 nm, preferably from 10 nm to 35 nm, and more preferably from 15 nm to 30 nm. Examples of the small-particle-diameter carbon black include SAF, ISAF-HM, ISAF-LM, HAF-LS, HAF, HAF-HS, and the like. The above carbon black can be used alone or in combination of two or more thereof.

In the present invention, since the deterioration in workability can be prevented even when a large amount of carbon black is blended, the mechanical properties (elastic modulus) of the first compression rubber layer can be improved. Furthermore, the carbon black can reduce the coefficient of friction of the first compression rubber layer and can improve the abrasion resistance of the first compression rubber layer.

The proportion of the filler (particularly carbon black) may be about, for example, from 10 to 100 parts by mass, preferably from 20 to 80 parts by mass, and more preferably from 30 to 70 parts by mass (particularly 40 to 60 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the fitting property to the pulley groove may be lowered.

The proportion of carbon black is, for example, 50% by mass or more, preferably 80% by mass or more, more preferably 90% by mass or more, and may be 100% by mass, with respect to the total filler. In the case where the proportion of carbon black with respect to the total filler is too small, the rubber hardness of the first compression rubber layer may be lowered.

(D) Other Additives

The vulcanized rubber composition may contain, if necessary, a vulcanizing agent or cross-linking agent, co-cross-linking agent, an auxiliary vulcanizing agent, a vulcanization accelerator, a vulcanization retardant, metal oxides (calcium oxide, barium oxide, iron oxide, copper oxide, titanium oxide, aluminum oxide, etc.), softeners (oils such as paraffin oil and naphthenic oil, etc.), processing agents or processing aids (e.g., fatty acids such as stearic acid, fatty acid metal salts such as stearic acid metal salts, fatty acid amides such as stearic acid amide, wax, paraffin, etc.), adhesiveness improving agents (e.g., a resorcin-formaldehyde co-condensate (RF condensate), an amino resin (a condensate of a nitrogen-containing cyclic compound and formaldehyde, for example, melamine resins such as hexamethylolmelamine and hexaalkoxymethylmelamine (hexamethoxymethylmelamine, hexabutoxymethylmelamine, etc.), urea resins such as methylolurea, benzoguanamine resins such as a methylolbenzoguanamine resin, etc.), a co-condensate of them (a resorcin-melamine-formaldehyde co-condensate, etc.), etc.), anti-aging agents (an antioxidant, an anti-heat-aging agent, an anti-flex-cracking agent, an antiozonant, etc.), a colorant, a tackifier, a plasticizer, a lubricant, coupling agents (a silane coupling agent, etc.), stabilizers (a UV absorber, a heat stabilizer, etc.), a flame retardant, an antistatic agent, and the like. The metal oxides may function as cross-linking agents. In the adhesiveness improving agent, the resorcin-formaldehyde co-condensate and the amino resin may be an initial condensate (prepolymer) of a nitrogen-containing cyclic compound such as resorcin and/or melamine and formaldehyde.

As the vulcanizing agent or cross-linking agent, common components can be used depending on the type of the rubber component, and examples thereof include metal oxide vulcanizing agents (magnesium oxide, zinc oxide, lead oxide, etc.), organic peroxides (diacyl peroxide, peroxyester, dialkyl peroxide, etc.), sulfur-based vulcanizing agents, and the like. Examples of the sulfur-based vulcanizing agents include powdered sulfur, precipitated sulfur, colloidal sulfur, insoluble sulfur, highly dispersible sulfur, sulfur chlorides (sulfur monochloride, sulfur dichloride, etc.), and the like. These cross-linking agents or vulcanizing agents can be used alone or in combination of two or more thereof. In the case where the rubber component is chloroprene rubber, a metal oxide (magnesium oxide, zinc oxide, etc.) may be used as the vulcanizing agent or cross-linking agent. The metal oxide may be used in combination with another vulcanizing agent (a sulfur-based vulcanizing agent, etc.), and the metal oxide and/or the sulfur-based vulcanizing agent may be used alone or in combination with a vulcanization accelerator.

The proportion of the vulcanizing agent can be selected from the range of, for example, from about 1 to 20 parts by mass in terms of solid content, with respect to 100 parts by mass of the rubber component, depending on the types of the vulcanizing agent and the rubber component. For example, the proportion of the metal oxide as the vulcanizing agent is about, for example, from 1 to 20 parts by mass, preferably from 3 to 17 parts by mass, and more preferably from 5 to 15 parts by mass (particularly 7 to 13 parts by mass), with respect to 100 parts by mass of the rubber component. In the case of combining the metal oxide and the sulfur-based vulcanizing agent, the proportion of the sulfur-based vulcanizing agent is about, for example, from 0.1 to 50 parts by mass, preferably from 1 to 30 parts by mass, and more preferably from 3 to 10 parts by mass, with respect to 100 parts by mass of the metal oxide. The proportion of an organic peroxide is about, for example, from 1 to 8 parts by mass, preferably from 1.5 to 5 parts by mass, and more preferably from 2 to 4.5 parts by mass, with respect to 100 parts by mass of the rubber component.

Examples of the co-cross-linking agent (cross-linking aid or co-vulcanizing agent) include known cross-linking aids, for example, polyfunctional (iso)cyanurates (e.g., triallyl isocyanurate (TAIL), triallyl cyanurate (TAC), etc.); polydienes (e.g., 1,2-polybutadiene, etc.); metal salts of unsaturated carboxylic acids (e.g., polyvalent metal salts of (meth) acrylic acid such as zinc (meth)acrylate and magnesium (meth)acrylate); oximes (e.g., quinonedioxime etc.); guanidines (e.g., diphenylguanidine, etc.); polyfunctional (meth) acrylates (e.g., alkanediol di(meth)acrylates such as ethylene glycol di(meth)acrylate and butanediol di(meth)acrylate, and alkanepolyol poly(meth)acrylates such as trimethylolpropane tri(meth)acrylate and pentaerythritol tetra(meth) acrylate); and bismaleimides (aliphatic bismaleimides such as alkylene bismaleimides such as N,N'-1,2-ethylenedimaleimide, N,N'-hexamethylene bismaleimide, and 1,6'-bismaleimide-(2,2,4-trimethyl)cyclohexane; arene bismaleimides or aromatic bismaleimides such as N,N'-m-phenylene dimaleimide, 4-methyl-1,3-phenylenedimaleimide, 4,4'-diphenylmethanedimaleimide, 2,2-bis[4-(4-maleimidophenoxy)phenyl]propane, 4,4'-diphenyl ether dimaleimide, 4,4'-diphenyl sulfone dimaleimide, and 1,3-bis(3-maleimidophenoxy)benzene; etc.); and the like. These cross-linking aids can be used alone or in combination of two or more thereof. Among these cross-linking aids, preferred are polyfunctional (iso)cyanurates, polyfunctional (meth)acrylates, bismaleimides (arene bismaleimides or aromatic bismaleimides such as N,N'-m-phenylene dimaleimide). Bismaleimides are often used. Addition of the cross-linking aid (e.g., bismaleimides) can increase the degree of cross-linking and can prevent adhesion abrasion.

The proportion of the co-cross-linking agent (cross-linking aid) such as bismaleimides is about, for example, from 0.1 to 10 parts by mass, preferably from 0.5 to 8 parts by mass, and more preferably from 1 to 5 parts by mass (particularly 2 to 4 parts by mass) in terms of solid content, with respect to 100 parts by mass of the rubber component.

Examples of the vulcanization accelerator include: thiuram accelerators (e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), N,N'-dimethyl-N,N'-diphenylthiuram disulfide, etc.); thiazole accelerators (e.g., 2-mercaptobenzothiazole, a zinc salt of 2-mercaptobenzothiazole, 2-mercaptothiazoline, dibenzothiazyl disulfide, 2-(4'-morpholinodithio)benzothiazole, etc.); sulfenamide accelerators (e.g., N-cyclohexyl-2-benzothiazylsulfenamide (CBS), N,N'-dicyclohexyl-2-benzothiazylsulfenamide, etc.); guanidines (diphenylguanidine and di-o-tolylguanidine, etc.); urea-based or thiourea-based accelerators (e.g., ethylenethiourea, etc.); dithiocarbamates; xanthates; and the like. These vulcanization accelerators can be used alone or in combination of two or more thereof. Among the vulcanization accelerators, TMTD, DPTT, CBS, and the like are widely used.

The proportion of the vulcanization accelerator is about, for example, from 0.1 to 15 parts by mass, preferably from 0.3 to 10 parts by mass (e.g., 0.5 to 5 parts by mass), and more preferably from 0.5 to 3 parts by mass (particularly 0.5 to 1.5 parts by mass) in terms of solid content, with respect to 100 parts by mass of the rubber component.

The proportion of the softener (oils such as naphthenic oil) is about, for example, from 1 to 30 parts by mass, preferably from 3 to 20 parts by mass, and more preferably from 3 to 10 parts by mass (particularly 3 to 8 parts by mass) in terms of solid content, with respect to 100 parts by mass of the rubber component.

The proportion of the processing agent or processing aid (stearic acid, etc.) is about, for example, 10 parts by mass or less (e.g., 0 to 10 parts by mass), preferably from 0.1 to 5 parts by mass (e.g., 0.5 to 3 parts by mass), and more preferably from 1 to 3 parts by mass (particularly 1.5 to 2.5 parts by mass) in terms of solid content, with respect to 100 parts by mass of the rubber component.

The proportion of the adhesiveness improving agent (a resorcin-formaldehyde co-condensate, hexamethoxymethylmelamine, etc.) is about, for example, from 0.1 to 20 parts by mass (e.g., 0.2 to 10 parts by mass), preferably from 0.3 to 5 parts by mass (e.g., 0.5 to 2.5 parts by mass), and more preferably from 0.5 to 3 parts by mass (particularly 0.5 to 1.5 parts by mass) in terms of solid content, with respect to 100 parts by mass of the rubber component.

The proportion of the anti-aging agent is about, for example, from 0.5 to 15 parts by mass, preferably from 1 to 10 parts by mass, and more preferably from 2.5 to 7.5 parts by mass (particularly 3 to 7 parts by mass) in terms of solid content, with respect to 100 parts by mass of the rubber component.

(Second Compression Rubber Layer)

As a rubber component constituting a vulcanized rubber composition forming the second compression rubber layer, the rubber components exemplified as the rubber component (A) of the first compression rubber layer can be used, and descriptions of preferred forms are also the same as those of the rubber component (A) of the first compression rubber layer.

The vulcanized rubber composition of the second compression rubber layer may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the second compression rubber layer, the proportion of the filler (particularly carbon black) is about, for example, from 5 to 80 parts by mass, preferably from 10 to 60 parts by mass, and more preferably from 15 to 50 parts by mass (particularly 20 to 40 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the fitting property to the pulley groove may be lowered.

The vulcanized rubber composition of the second compression rubber layer may further contain a plasticizer in addition to the rubber component. Examples of the plasticizer include aliphatic carboxylic acid plasticizers (an adipic acid ester plasticizer, a sebacic acid ester plasticizer, etc.), aromatic carboxylic acid ester plasticizers (a phthalic acid ester plasticizer, a trimellitic acid ester plasticizer, etc.), an oxycarboxylic acid ester plasticizer, a phosphoric acid ester plasticizer, an ether plasticizer, an ether ester plasticizer, and the like. These plasticizers can be used alone or in combination of two or more thereof. Among these, an ether ester plasticizer is preferred.

The proportion of the plasticizer is about, for example, from 1 to 30 parts by mass, preferably from 3 to 20 parts by mass, and more preferably from 3 to 10 parts by mass (particularly 3 to 8 parts by mass), with respect to 100 parts by mass of the rubber component.

The vulcanized rubber composition of the second compression rubber layer may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the second compression rubber layer preferably contains a vulcanizing agent or cross-linking agent, a vulcanization accelerator, a processing agent or processing aid, and an anti-aging agent in addition to the rubber component.

The proportion of the metal oxide as the vulcanizing agent is about, for example, from 1 to 20 parts by mass, preferably from 3 to 17 parts by mass, and more preferably from 5 to 15 parts by mass (particularly 7 to 13 parts by mass), with respect to 100 parts by mass of the rubber component.

The proportion of the vulcanization accelerator is about, for example, from 0.1 to 15 parts by mass, preferably from 0.3 to 10 parts by mass (e.g., 0.5 to 5 parts by mass), and more preferably from 0.5 to 3 parts by mass (particularly 0.5 to 1.5 parts by mass) in terms of solid content, with respect to 100 parts by mass of the rubber component.

The proportion of the processing agent or processing aid (stearic acid, etc.) is about, for example, 10 parts by mass or less (e.g., 0 to 5 parts by mass), preferably from 0.1 to 3 parts by mass, and more preferably from 0.3 to 2 parts by mass (particularly 0.5 to 1.5 parts by mass), with respect to 100 parts by mass of the rubber component.

The proportion of the anti-aging agent is about, for example, from 0.5 to 15 parts by mass, preferably from 1 to 10 parts by mass, and more preferably from 2.5 to 7.5 parts by mass (particularly 3 to 7 parts by mass), with respect to 100 parts by mass of the rubber component.

[Tension Rubber Layer]

As described above, the rubber hardness of the tension rubber layer is higher than the rubber hardness of the second compression rubber layer and lower than the rubber hardness of the first compression rubber layer.

The rubber hardness Hs of the tension rubber layer can be selected from the range of, for example, from about 75° to 95°, and is about, for example, from 80° to 93° (e.g., 85° to) 90°, preferably from 86° to 90°, and more preferably from 88° to 90°. In the case where the rubber hardness is too small, the lateral pressure resistance may be lowered, and in the case where the rubber hardness is too large, the hardness is too high, and the fitting property to the pulley groove may be lowered.

The tensile elastic modulus (modulus) of the tension rubber layer is about, for example, from 15 MPa to 30 MPa, preferably from 17 MPa to 28 MPa, and more preferably from 20 MPa to 27 MPa in the belt width direction. In the case where the tensile elastic modulus is too small, the lateral pressure resistance may be lowered, and in the case where the tensile elastic modulus is too large, the hardness is too high, and the fitting property to the pulley groove may be lowered.

The average thickness of the tension rubber layer may be about, for example, from 0.5 mm to 10 mm (e.g., 0.5 mm to 1.5 mm), preferably from 0.6 mm to 5 mm, and more preferably from 0.7 mm to 3 mm (particularly 0.8 mm to 1 mm).

The tension rubber layer may be formed of a vulcanized rubber composition commonly used as the rubber composition of a wrapped V-belt. The vulcanized rubber composition may be a vulcanized rubber composition containing a rubber component, and when the composition of the vulcanized rubber composition is appropriately adjusted, it is possible to adjust the rubber hardness or the like of the tension rubber layer. The method for adjusting the rubber hardness or the like is not particularly limited. The rubber hardness or the like may be adjusted by changing the composition and/or type of components constituting the vulcanized rubber composition, and is preferably adjusted by changing the proportion and/or type of short fibers and fillers, from the viewpoint of simplicity.

As a rubber component constituting a vulcanized rubber composition forming the tension rubber layer, the rubber components exemplified as the rubber component (A) of the first compression rubber layer can be used, and descriptions of preferred forms are also the same as those of the rubber component (A) of the first compression rubber layer.

The vulcanized rubber composition of the tension rubber layer may further contain short fibers in addition to the rubber component. As the short fibers, the short fibers exemplified as the short fibers (B) of the first compression rubber layer can be used, and descriptions of preferred forms and the proportion with respect to the rubber component are the same as those of the short fibers (B) of the first compression rubber layer.

The vulcanized rubber composition of the tension rubber layer may further contain a filler. As the filler, the fillers exemplified as the filler (C) of the first compression rubber layer can be used, and descriptions of preferred forms and the proportion of carbon black in the filler are the same as those of the filler (C) of the first compression rubber layer.

In the tension rubber layer, the proportion of the filler (particularly carbon black) is about, for example, from 5 to 100 parts by mass, preferably from 10 to 80 parts by mass, and more preferably from 20 to 60 parts by mass (particularly 30 to 50 parts by mass), with respect to 100 parts by mass of the rubber component. In the case where the proportion of the filler is too small, the elastic modulus may be insufficient and the lateral pressure resistance and durability may be lowered, and in the case where the proportion is too large, the elastic modulus is too high, and the fitting property to the pulley groove may be lowered.

The vulcanized rubber composition of the tension rubber layer may further contain other additives in addition to the rubber component. As the other additives, the other additives exemplified as the other additives (D) of the first compression rubber layer can be used, and descriptions of preferred forms and the proportion with respect to the rubber component are the same as those of the other additives (D) of the first compression rubber layer.

[Tension Member Layer]

The tension member layer needs only include the tension member, and may be a tension member layer formed of only the tension member, as described above. A tension member layer (adhesion rubber layer) formed of a vulcanized rubber composition embedded with a tension member is preferred from the viewpoint of preventing separation between layers and improving durability of the belt. The tension member layer formed of a vulcanized rubber composition embedded with a tension member is generally called an adhesion rubber layer, and the tension member is embedded in a layer formed of the vulcanized rubber composition containing a rubber component. The adhesion rubber layer is interposed between the tension rubber layer and the compression rubber layer (particularly the first compression rubber layer) to adhere the tension rubber layer and the compression rubber layer, and the tension member is embedded in the adhesion rubber layer.

The average thickness of the adhesion rubber layer is about, for example, from 0.2 mm to 5 mm, preferably from 0.3 mm to 3 mm, and more preferably from 0.3 mm to 2 mm (particularly 0.5 mm to 1.5 mm).

(Vulcanized Rubber Composition) The rubber hardness Hs of the vulcanized rubber composition forming the adhesion rubber layer is about, for example, from 72° to 80°, preferably from 73° to 78°, and more preferably from 75° to 77°. In the case where the rubber hardness is too small, the lateral pressure resistance may be lowered, and in the case where the rubber hardness is too large, the vulcanized rubber composition around the tension member becomes rigid, making the tension member less likely to bend, causing deterioration of the adhesion rubber layer due to heat generation (cracks), bending fatigue of the tension member and the like, and thus causing separation of the tension member in some cases.

As a rubber component constituting the vulcanized rubber composition forming the adhesion rubber layer, the rubber components exemplified as the rubber component (A) of the first compression rubber layer can be used, and descriptions of preferred forms are also the same as those of the rubber component (A) of the first compression rubber layer.

The vulcanized rubber composition of the adhesion rubber layer may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the adhesion rubber layer, the proportion of the filler is about, for example, from 1 to 100 parts by mass, preferably from 10 to 80 parts by mass, and more preferably from 30 to 70 parts by mass (particularly 40 to 60 parts by mass), with respect to 100 parts by mass of the rubber component. The proportion of carbon black is about, for example, from 1 to 50 parts by mass, preferably from 10 to 45 parts by mass, and more preferably from 20 to 40 parts by mass, with respect to 100 parts by mass of the rubber component.

The vulcanized rubber composition of the adhesion rubber layer may further contain a plasticizer in addition to the rubber component. As the plasticizer, the plasticizers exemplified as the plasticizer of the second compression rubber layer can be used, and descriptions of preferred forms and the proportion with respect to the rubber component are the same as those of the plasticizer of the second compression rubber layer.

The vulcanized rubber composition of the adhesion rubber layer may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the adhesion rubber layer preferably contains a vulcanizing agent or cross-linking agent, a vulcanization accelerator, a processing agent or processing aid, and an anti-aging agent in addition to the rubber component. Descriptions of the proportion of these additives with respect to the rubber component are the same as that of the second compression rubber layer.

(Tension Member)

Tension members contained in the tension member layer are generally cords (twisted cords) arranged at a predetermined interval in the belt width direction. The cords are arranged so as to extend in the longitudinal direction of the belt, and generally arranged so as to extend in parallel at a predetermined pitch in parallel with the longitudinal direction of the belt. In the case where the tension member is embedded in the adhesion rubber layer, a part thereof may be embedded in the adhesion rubber layer, and preferred is a form in which the cord is embedded in the adhesion rubber layer (a form in which the entire cord is completely embedded in the adhesion rubber layer) from the viewpoint of improving durability. The tension member is preferably a cord.

As fibers constituting the cord, use can be widely made of, for example: synthetic fibers such as polyolefin fibers (a polyethylene fiber, a polypropylene fiber, etc.), polyamide fibers (a polyamide 6 fiber, a polyamide 66 fiber, a polyamide 46 fiber, an aramid fiber, etc.), polyester fibers (polyalkylene arylate fibers) (poly $C_{2-4}$ alkylene-$C_{6-14}$ arylate fibers such as a polyethylene terephthalate (PET) fiber and a polyethylene naphthalate (PEN) fiber, etc.), vinylon fibers, polyvinyl alcohol fibers, and polyparaphenylene benzobisoxazole (PBO) fibers; natural fibers such as cotton, hemp and wool; inorganic fibers such as carbon fibers; and the like. These fibers can be used alone or in combination of two or more thereof.

Among these fibers, from the viewpoint of a high modulus, synthetic fibers such as polyester fibers (polyalkylene arylate fibers) containing, as a main constituent unit, $C_{2-4}$ alkylene-$C_{6-10}$ arylates, such as ethylene terephthalate and ethylene-2,6-naphthalate and polyamide fibers (an aramid fiber, etc.), and inorganic fibers such as a carbon fiber are widely used, and preferred are polyester fibers (particularly a polyethylene terephthalate fiber and a polyethylene naphthalate fiber) and polyamide fibers (particularly an aramid fiber).

The fibers may be multifilament yarns. The fineness of the multifilament yarn may be about, for example, from 2,000 to 10,000 denier (particularly 4,000 to 8,000 denier). The multifilament yarn may include about, for example, from 100 to 5,000 monofilament yarns, preferably from 500 to 4,000 monofilament yarns, and more preferably from 1,000 to 3,000 monofilament yarns.

As the cord, a twisted cord using multifilament yarns (e.g., plied twist, single twist, and rung twist) can be generally used. The average wire diameter of the cord (fiber diameter of the twisted cord) may be about, for example, from 0.5 mm to 3 mm, preferably from 0.6 mm to 2.5 mm, and more preferably from 0.7 mm to 2 mm.

In the case where the cord is embedded in the adhesion rubber layer, the cord may be subjected to a surface treatment in order to improve the adhesiveness with the vulcanized rubber composition forming the adhesion rubber layer. Examples of the surface treatment agent include the surface treatment agents exemplified as the surface treatment agent for the short fibers of the first compression rubber layer. These surface treatment agents may be used alone or in combination of two or more thereof, and the cord may be sequentially treated with the same or different surface treatment agents for a plurality of times. The cord is preferably subjected to at least an adhesion treatment with an RFL liquid.

[Outside Cloth]

The outside cloth (cover cloth) is formed of a common cloth. Examples of the cloth include cloth materials such as woven cloths, knitted cloths (weft knitted cloths and warp knitted cloths), and non-woven cloths, and the like. Among these, preferred are woven cloths woven in the form of plain weave, twill weave, satin weave, or the like, woven cloths woven at wide angles where the crossing angle between the warp and the weft is more than 90° and 120° or less, and knitted cloths. Particularly preferred are woven cloths widely used as cover cloths for power transmission belts for use in general industry machinery and agricultural machinery (a plain woven cloth in which the crossing angle of the warp and the weft is a right angle, and a plain woven cloth in which the crossing angle of the warp and the weft is a wide angle of more than 90° and 120° or less (wide-angle fabric)). Furthermore, in an application requiring durability, a wide-angle fabric may be used.

As fibers constituting the cloth, use can be widely made of, for example: synthetic fibers such as polyolefin fibers (a polyethylene fiber, a polypropylene fiber, etc.), polyamide fibers (a polyamide 6 fiber, a polyamide 66 fiber, a polyamide 46 fiber, an aramid fiber, etc.), polyester fibers (a polyalkylene arylate fiber, etc.), vinyl alcohol fibers (a polyvinyl alcohol fiber, an ethylene-vinyl alcohol copolymer fiber, a vinylon fiber, etc.), and polyparaphenylene benzobisoxazole (PBO) fibers; natural fibers such as cellulosic fibers (a cellulose fiber and a fiber of a cellulose derivative), and wool; and inorganic fibers such as a carbon fiber. These fibers may be a single yarn used alone, or may be a blended yarn in which two or more kinds are combined.

Among these fibers, a blended yarn of a polyester fiber and a cellulosic fiber is preferred from the viewpoint of excellent mechanical properties and economical efficiency.

The polyester fiber may be a polyalkylene arylate fiber. Examples of the polyalkylene arylate fiber include poly $C_{2-4}$ alkylene-$C_{8-14}$ arylate fibers such as a polyethylene terephthalate (PET) fiber and a polyethylene naphthalate (PEN) fiber, and the like.

The cellulosic fibers include cellulose fibers (cellulose fibers derived from plants, animals, bacteria, etc.) and fibers of cellulose derivatives. Examples of the cellulose fibers include: natural-plant-derived cellulose fibers (pulp fibers) such as wood pulp (softwood pulp, hardwood pulp, etc.), bamboo fibers, sugar cane fibers, seed hair fibers (cotton fiber (cotton linter), kapok, etc.), and gin skin fibers (linen, kozo, mitsumata, etc.), leaf fibers (Manila hemp, New Zealand hemp, etc.); animal-derived cellulose fibers such as ascidian cellulose; bacterial cellulose fibers; algae celluloses; and the like. Examples of the fibers of cellulose derivatives include cellulose ester fibers, regenerated cellulose fibers (rayon, cupra, lyocell, etc.) and the like.

The mass ratio of the polyester fiber to the cellulosic fiber, that is, the former/the latter is about, for example, from 90/10 to 10/90, preferably from 80/20 to 20/80, and more preferably from 70/30 to 30/70 (particularly 60/40 to 40/60).

The average fineness of the fibers constituting the cloth is about, for example, from to 30 count, preferably from 10 to 25 count, and more preferably from 10 to 20 count.

The basis weight amount of the cloth (raw material cloth) is about, for example, from 100 g/m2 to 500 g/m2, preferably from 200 g/m2 to 400 g/m2, and more preferably from 250 g/m2 to 350 g/m2.

In the case where the cloth (raw material cloth) is a woven cloth, the yarn density (density of warp and weft) of the cloth is about, for example, from 60 to 100 yarns per 50 mm, preferably from 70 to 90 yarns per 50 mm, and more preferably from 75 to 85 yarns per 50 mm.

The outside cloth may be a single layer or multiple layers (e.g., about from 2 to 5 layers, preferably from 2 to 4 layers, and more preferably from 2 to 3 layers), and a single layer (1 ply) or a double layer (2 plies) is preferred from the viewpoint of productivity and the like.

The outside cloth may be a cloth to which a rubber component is adhered in order to improve the adhesiveness with the belt body. The outside cloth to which a rubber component is adhered may be a cloth obtained by performing, for example, an adhesion treatment such as a treatment of soaking (immersing) a cloth in a rubber paste prepared by dissolving a rubber composition in a solvent, or a treatment of frictioning (rubbing) a cloth with a solid rubber composition. The adhesion treatment may be performed on at least one surface of the cloth, and it is preferable to treat at least the surface in contact with the belt body.

As a rubber component constituting the rubber composition adhered to the outside cloth, the rubber components exemplified as the rubber component (A) of the first compression rubber layer can be used, and descriptions of preferred forms are also the same as those of the rubber component (A) of the first compression rubber layer.

The rubber composition adhered to the outside cloth may further contain a filler in addition to the rubber component. As the filler, the fillers exemplified as the filler (C) of the first compression rubber layer can be used, and descriptions of preferred forms and the proportion of carbon black in the filler are the same as those of the filler (C) of the first compression rubber layer.

In the rubber composition adhered to the outside cloth, the proportion of the filler (particularly carbon black) is about, for example, from 5 to 80 parts by mass, preferably from to 75 parts by mass, and more preferably from 30 to 70 parts by mass (particularly 40 to 60 parts by mass), with respect to 100 parts by mass of the rubber component.

The rubber composition adhered to the outside cloth may further contain a plasticizer in addition to the rubber component. As the plasticizer, the plasticizers exemplified as the plasticizer of the second compression rubber layer can be used, and descriptions of preferred forms are the same as those of the plasticizer of the second compression rubber layer.

In the rubber composition adhered to the outside cloth, the proportion of the plasticizer is about, for example, from 3 to 50 parts by mass, preferably from 5 to 40 parts by mass, and more preferably from 10 to 30 parts by mass (particularly 15 to 25 parts by mass), with respect to 100 parts by mass of the rubber component.

The rubber composition adhered to the outside cloth may further contain short fibers and other additives in addition to the rubber component. As the short fibers, the short fibers exemplified as the short fibers (B) of the first compression rubber layer can be used, and as the other additives, the additives exemplified as the other additives (D) of the first compression rubber layer can be used. Among these, the rubber composition adhered to the outside cloth preferably contains a vulcanizing agent or cross-linking agent, a vulcanization accelerator, a processing agent or processing aid, and an anti-aging agent in addition to the rubber component. Descriptions of the proportion of these additives with respect to the rubber component are the same as that of the second compression rubber layer.

The coefficient of friction of the outside cloth, which is the power transmission surface, is about, for example, from 0.9 to 1, preferably from 0.91 to 0.96, and more preferably from 0.92 to 0.95. In the present description and claims, the coefficient of friction can be measured by the method described in Examples to be described later.

The average thickness of the outside cloth (average thickness of each layer in the case of multiple layers) is about, for example, from 0.4 to 2 mm, preferably from 0.5 to 1.4 mm, and more preferably from 0.6 to 1.2 mm. In the case where the thickness of the outside cloth is too small, the abrasion resistance may be lowered, and in the case where the thickness is too large, the bending resistance of the belt may be lowered.

[Reinforcing Cloth Layer]

The wrapped V-belt according to the present invention may further include a reinforcing cloth layer between the inner peripheral surface (surface at the inner peripheral side) of the compression rubber layer and the outside cloth. FIG. 3 illustrates an example of the wrapped V-belt according to the present invention provided with a reinforcing cloth layer. In this example, a wrapped V-belt 11 includes, similar to the wrapped V-belt in FIG. 2, a tension rubber layer 12, an adhesion rubber layer 14 embedded with tension members (cords) 13, a first compression rubber layer 15a, and a second compression rubber layer 15b, and, unlike the wrapped V-belt in FIG. 2, has a reinforcing cloth layer 17 interposed between the second compression rubber layer 15b and an outside cloth 16.

The reinforcing cloth layer is also formed of a commonly used cloth, similar to the outside cloth. As the cloth, the cloths exemplified as the cloth for the outside cloth can be used, and descriptions of preferred forms are the same as those of the outside cloth.

The reinforcing cloth layer may be a cloth to which a rubber component is adhered in order to improve the adhesiveness with the compression rubber layer and the outside cloth. The outside cloth to which a rubber component is adhered may be a cloth obtained by performing, for example, an adhesion treatment such as a treatment of soaking (immersing) a cloth in a rubber paste prepared by dissolving a rubber composition in a solvent, or a treatment of frictioning (rubbing) a cloth with a solid rubber composition. As the rubber composition, the rubber compositions exemplified as the rubber composition for the outside cloth can be used, and descriptions of preferred forms are the same as those of the outside cloth. The adhesion treatment may be performed on at least one surface of the cloth, preferably at least the surface in contact with the compression rubber layer, and particularly preferably both surfaces.

The average thickness of the reinforcing cloth layer is about, for example, from 0.4 to 2 mm, preferably from 0.5 to 1.4 mm, and more preferably from 0.6 to 1.2 mm. In the case where the thickness of the reinforcing cloth layer is too small, the effect of improving the abrasion resistance may be lowered, and in the case where the thickness is too large, the bending resistance of the belt may be lowered.

[Method for Producing Wrapped V-Belt]

The wrapped V-belt according to the present invention can be produced by a conventional method, for example, the method described in JP-A-H06-137381 or WO 2015/104778, and the like.

Specifically, the wrapped V-belt according to the present invention can be obtained through, for example: a winding step of cutting a laminate including a cloth for reinforcing cloth subjected to an adhesion treatment and an unvulcanized second compression rubber layer sheet and a first compression rubber layer sheet obtained by a rolling treatment, setting the cut laminate on a mantle, winding an unvulcanized adhesion rubber layer sheet around the first compression rubber layer sheet, then winding a tension member on the wound adhesion rubber layer sheet, and then winding an unvulcanized tension rubber layer sheet on the wound tension member; a cutting step of cutting (ring cutting) the obtained annular laminate on the mantle; a skiving step of bridging the cut annular laminate over a pair of pulleys and cutting the laminate into a V shape under rotation; wrapping (covering) the obtained unvulcanized belt body with a cloth for outside cloth subjected to an adhesion treatment; and a vulcanization step. In the vulcanization step, the vulcanization temperature can be selected depending on the type of the rubber component, and is about, for example, from 120° C. to 200° C., and preferably from 150° C. to 180° C. In each rubber layer sheet containing short fibers, the short fibers can be arranged (orientated) in the rolling direction by a method such as a rolling treatment with a calender roll.

EXAMPLES

Hereinafter, the present invention will be described in more detail based on Examples, but the present invention is not limited to these Examples. The raw materials used for the rubber composition, the method for preparing the rubber composition, the fiber material used, the measurement method or evaluation method for each physical property, and the like are described below.

[Raw Materials Used for Rubber Composition]

Chloroprene rubber: "PM-40" manufactured by Denka Company Limited.

Magnesium oxide: "KYOWAMAG 30" manufactured by Kyowa Chemical Industry Co., Ltd.

Stearic acid: "STEARIC ACID CAMELLIA" manufactured by NOF CORPORATION

Anti-aging agent: "NONFLEX OD-3" manufactured by Seiko Chemical Co., Ltd.

Carbon black: "SEAST 3" manufactured by Tokai Carbon Co., Ltd.

Silica: "ULTRASIL (registered trademark) VN3" manufactured by Evonik Japan Ltd., BET specific surface area: 175 $m^2/g$ Plasticizer: "RS-700" manufactured by ADEKA Corporation Vulcanization accelerator: "NOCCELER TT" manufactured by OUCHI SHINKO CHEMICAL INDUSTRIAL CO., LTD.

Zinc oxide: "zinc oxide Type III" manufactured by SEIDO CHEMICAL INDUSTRY CO., LTD.

Naphthenic oil: "NS-900" manufactured by Idemitsu Kosan Co., Ltd.

N,N'-m-phenylenedimaleimide: "VULNOC PM" manufactured by OUCHI SHINKO CHEMICAL INDUSTRIAL CO., LTD.

Aramid short fibers: "CONEX staple fiber" manufactured by Teijin Limited, average fiber length: 3 mm, average fiber diameter: 14 μm, short fibers with an adhesion rate of 6% by mass of the solid content, subjected to an adhesion treatment with a RFL liquid (2.6 parts of resorcin, 1.4 parts of 37% formalin, 17.2 parts of vinyl pyridine-styrene-butadiene copolymer latex (manufactured by Nippon Zeon Corporation), and 78.8 parts of water)

Polyester short fibers: manufactured by Teijin Limited, average short fiber length: 3 mm

[Cord]

Twisted cords of aramid fibers, average wire diameter: 1.985 mm

[Adhesion Rubber Layer and Rubber Composition for Friction Rubber]

A rubber composition A having the composition shown in Table 1 was kneaded with a Banbury mixer, and the kneaded rubber was passed through a calender roll to prepare an unvulcanized rolled rubber sheet having a predetermined thickness, so as to prepare an adhesion rubber layer sheet. In addition, a rubber composition B shown in Table 1 was kneaded with a Banbury mixer to prepare a bulk unvulcanized rubber composition for friction. Furthermore, Table 1 also shows the results of measuring the hardness and the tensile elastic modulus of vulcanizates of the respective rubber compositions.

TABLE 1

| | | Adhesion rubber layer Rubber composition A | Friction rubber Rubber composition B |
|---|---|---|---|
| Composition (part by mass) | Chloroprene rubber | 100 | 100 |
| | Magnesium oxide | 4 | 4 |
| | Stearic acid | 1 | 1 |
| | Anti-aging agent | 4 | 4 |
| | Carbon black | 30 | 50 |
| | Silica | 20 | 0 |
| | Plasticizer | 5 | 20 |
| | Vulcanization accelerator | 1 | 1 |
| | Zinc oxide | 5 | 5 |

TABLE 1-continued

|  |  | Adhesion rubber layer Rubber composition A | Friction rubber Rubber composition B |
|---|---|---|---|
| Properties of rubber vulcanized | Hardness Hs | 76 | 54 |
|  | Tensile elastic modulus (MPa) | 14.5 | 12.3 |

[Rubber Compositions for First Compression Rubber Layer, Second Compression Rubber Layer, and Tension Rubber Layer]

Rubber compositions C to L having respective compositions shown in Tables 2 and 3 were kneaded with a Banbury mixer, and the kneaded rubbers were passed through a calender roll to prepare unvulcanized rolled rubber sheets each having a predetermined thickness, so as to prepare first compression rubber layer sheets, second compression rubber layer sheets and tension rubber layer sheets (Table 3 shows only the second compression rubber layer sheets). Furthermore, Tables 2 and 3 also show the results of measuring the hardness and the tensile elastic modulus of vulcanizates of the respective rubber compositions.

[Rubber Hardness Hs of Vulcanized Rubber]

Each rubber layer sheet was press-vulcanized at a temperature of 160° C. for 30 minutes to prepare a vulcanized rubber sheet (100 mm×100 mm×2 mm thickness). A laminate obtained by laminating three vulcanized rubber sheets was used as a sample, and the hardness was measured by using a durometer A type hardness tester in accordance with JIS K6253 (2012). For the bulk unvulcanized rubber composition B for friction, a test piece was sampled from the bulk rubber and passed through a calender roll to prepare an unvulcanized rolled rubber sheet having a predetermined thickness.

[Tensile Elastic Modulus (Modulus) of Vulcanized Rubber] The vulcanized rubber sheet prepared for measuring the rubber hardness Hs of the vulcanized rubber was used as a sample, and a test piece punched out in a dumbbell shape was prepared in accordance with JIS K6251 (1993). In the sample containing short fibers, the test piece was punched out in a dumbbell shape such that the arrangement direction (grain direction) of the short fibers becomes the tensile direction. Then, both ends of the test piece were gripped by a chuck (grasping tool), and when the test piece was tensioned at a rate of 500 mm/min, the tensile stress (tensile elastic modulus) until the test piece was cut was measured.

TABLE 2

|  |  | First compression rubber layer, second compression rubber layer, and tension rubber layer | | | |
|---|---|---|---|---|---|
|  |  | Rubber composition C | Rubber composition D | Rubber composition E | Rubber composition F |
| Composition (part by mass) | Chloroprene rubber | 100 | 100 | 100 | 100 |
|  | Aramid short fibers | 10 | 20 | 20 | 25 |
|  | Polyester short fibers | 10 | 0 | 0 | 0 |
|  | Naphthenic oil | 5 | 5 | 5 | 5 |
|  | Magnesium oxide | 4 | 4 | 4 | 4 |
|  | Carbon black | 30 | 40 | 50 | 50 |
|  | Anti-aging agent | 4 | 4 | 4 | 4 |
|  | Zinc oxide | 5 | 5 | 5 | 5 |
|  | N,N'-m-phenylenedimaleimide | 3 | 3 | 3 | 3 |
|  | Stearic acid | 2 | 2 | 2 | 2 |
|  | Sulfur | 0.5 | 0.5 | 0.5 | 0.5 |
| Properties of vulcanized rubber | Hardness Hs | 85 | 90 | 93 | 95 |
|  | Tensile elastic modulus (MPa) (in grain direction) | 16.5 | 26.5 | 30.5 | 42.5 |

TABLE 3

|  |  | Second compression rubber layer | | | | | |
|---|---|---|---|---|---|---|---|
|  |  | Rubber composition G | Rubber composition H | Rubber composition I | Rubber composition J | Rubber composition K | Rubber composition L |
| Composition (part by mass) | Chloroprene rubber | 100 | 100 | 100 | 100 | 100 | 100 |
|  | Magnesium oxide | 4 | 4 | 4 | 4 | 4 | 4 |
|  | Stearic acid | 1 | 1 | 1 | 1 | 1 | 1 |
|  | Anti-aging agent | 4 | 4 | 4 | 4 | 4 | 4 |
|  | Carbon black | 18 | 22 | 26 | 30 | 34 | 38 |
|  | Plasticizer | 5 | 5 | 5 | 5 | 5 | 5 |
|  | Vulcanization accelerator | 1 | 1 | 1 | 1 | 1 | 1 |
|  | Zinc oxide | 5 | 5 | 5 | 5 | 5 | 5 |
| Properties of vulcanized rubber | Hardness Hs | 70 | 72 | 74 | 76 | 78 | 00 |
|  | Tensile elastic modulus (MPa) | 14.5 | 15.0 | 15.5 | 15.5 | 15.5 | 16.0 |

[Woven Cloths for Outside Cloth and Reinforcing Cloth Layer]

A woven cloth (120° wide-angle weave, fineness: 20 count for warp and 20 count for weft, yarn density of warp and weft: 75 yarns per 50 mm, basis weight amount: 280 g/m2) of a blended yarn formed of a polyester fiber and cotton (polyester fiber/cotton=50/50 in mass ratio) and the rubber composition B shown in Table 1 were used A friction treatment was performed in such a manner that the rubber composition B and the woven cloth were simultaneously passed between rolls having different surface speeds in a calender roll so as to rub the rubber composition B into textures of the woven cloth (each side of the woven fabric was treated once), to thereby prepare a reinforcing cloth precursor and an outside cloth precursor.

[Coefficient of Friction of Belt]

For the coefficient of friction of the belt, as illustrated in FIG. 4, one end portion of a cut belt 21 was fixed to a load cell 22, a load 23 of 3 kgf was placed on the other end portion, and the belt 21 was wound around a pulley 24 with a belt winding angle around the pulley 24 being 45°. Then, the belt 21 on the load cell 22 side was tensioned at a rate of 30 mm/s for about 15 seconds, and the average coefficient of friction of the frictional power transmission surface (outside cloth) was measured. During the measurement, the pulley 24 was fixed so as not to rotate.

[Belt Running Test]

(JIS B Type Wrapped V-Belt Test)

The wrapped V-belts obtained in Examples and Comparative Examples were used, the belts were ran under conditions shown in Table 4 by using a multi-shaft layout tester equipped with a drive (DR) pulley having a diameter of 175 mm, a driven (Dn1) pulley having a diameter of 150 mm, a driven (Dn2) pulley having a diameter of 162 mm, a driven (Dn3) pulley having a diameter of 140 mm, a tension (Ten1) pulley having a diameter of 80 mm, a driven (Dn4) pulley having a diameter of 127 mm, a tension (Ten2) pulley having a diameter of 70 mm, and a tension (Ten3) pulley having a diameter of 70 mm, as illustrated in FIG. 5, and the time when the overturn of the belt occurred was evaluated. The evaluation of the overturn prevention property is evaluated according to the following criteria, and the evaluation becomes higher in the order of D, C, B, and A.

A: the time until the overturn occurs is 50 hours or longer
B: the time until the overturn occurs is 40 hours or longer and shorter than 50 hours
C: the time until the overturn occurs is 30 hours or longer and shorter than 40 hours
D: the time until the overturn occurs is shorter than 30 hours

TABLE 4

| Belt type/size | JIS B type/157 inch |
| --- | --- |
| Winding number | Wind two belts |
| Rotation rate | 899 rpm |
| Tension load | 7.5 kg |
| Load | 18.6 ps (9.3 per belt) |

(JIS C Type Wrapped V-Belt Test)

The wrapped V-belts obtained in Examples and Comparative Examples were used, the belts were ran under conditions shown in Table 5 by using a multi-shaft layout tester equipped with a drive (DR) pulley having a diameter of 261 mm, a driven (Dn1) pulley having a diameter of 224 mm, a driven (Dn2) pulley having a diameter of 241 mm, a driven (Dn3) pulley having a diameter of 209 mm, a tension (Ten1) pulley having a diameter of 119 mm, a driven (Dn4) pulley having a diameter of 189 mm, a tension (Ten2) pulley having a diameter of 104 mm, and a tension (Ten3) pulley having a diameter of 104 mm, as illustrated in FIG. 6, and the time when the overturn of the belt occurred was evaluated. The evaluation of the overturn prevention property is evaluated according to the following criteria, and the evaluation becomes higher in the order of D, C, B, and A.

A: the time until the overturn occurs is 50 hours or longer
B: the time until the overturn occurs is 40 hours or longer and shorter than 50 hours
C: the time until the overturn occurs is 30 hours or longer and shorter than 40 hours
D: the time until the overturn occurs is shorter than 30 hours

TABLE 5

| Belt type/size | JIS C type/162 inch |
| --- | --- |
| Winding number | Wind two belts |
| Rotation rate | 899 rpm |
| Tension load | 7.5 kg |
| Load | 20.6 ps (10.3 per belt) |

Examples 1 to 15 and Comparative Examples 1 to 3

A laminate composed of the reinforcing cloth precursor, the second compression rubber layer sheet shown in Tables 6 to 9 and the first compression rubber layer sheet shown in Tables 6 to 9 was cut and placed on the outer peripheral surface of a cylindrical drum, and then the adhesion rubber layer sheet, the cord and the tension rubber layer sheet shown in Tables 6 to 9 were sequentially laminated and adhered thereto, to form a cylindrical unvulcanized sleeve in which the reinforcing cloth precursor, the unvulcanized rubber layers and the cord were laminated. The obtained unvulcanized sleeve was circumferentially cut while being disposed on the outer periphery of the cylindrical drum to form an annular unvulcanized rubber belt. In the case where the first compression rubber layer, the second compression rubber layer and the tension rubber layer contained short fibers, the short fibers were arranged in the belt width direction.

Next, the unvulcanized rubber belt was taken out from the drum, and both side surfaces of the unvulcanized rubber belt were cut (skived) at a predetermined angle to form the cross section of the unvulcanized rubber belt into a V shaped cross section. A cover wrapping treatment was performed such that the outer periphery of the unvulcanized rubber belt having a V-shaped cross section (the belt composed of the tension rubber layer 12, the adhesion rubber layer 14 embedded with the tension member (cords) 13, the first compression rubber layer 15a, the second compression rubber layer 15b, and the reinforcing cloth layer 17) was covered with the outside cloth precursor, as illustrated in FIG. 3, to thereby obtain an unvulcanized belt molded body.

The obtained unvulcanized belt molded body was inserted into a concave groove of a ring mold. Then, in a state where a cylindrical rubber sleeve was fitted on the outer peripheral surface of the ring mold and the unvulcanized belt molded body, all parts were housed in a vulcanization can and vulcanized at a vulcanization temperature of 160° C., to obtain a vulcanized belt. The obtained vulcanized belt was removed from the ring mold to obtain a B type wrapped V-belt (JIS B, cross-sectional dimensions: width 16.5 mm×thickness 11.0 mm, belt length 157 inches). The average thickness of the outside cloth was 0.62 mm Tables 6 to 9 show the results of evaluation of the overturn prevention property of the obtained wrapped V-belts. The results of the overturn prevention property are illustrated in a graph in FIG. 7. The coefficient of friction of the wrapped V-belt obtained in Example 1 was measured and found to be 0.93.

TABLE 6

|  | Comp. Ex. 1 | Ex. 1 | Ex. 2 | Ex. 3 | Comp. Ex. 2 | Comp. Ex. 3 | Ex. 4 | Ex. 5 |
|---|---|---|---|---|---|---|---|---|
| Tension rubber layer, hardness (Hs1) (°) | 85 | 85 | 85 | 85 | 90 | 95 | 90 | 90 |
| First compression rubber layer, hardness (Hs2) (°) | 85 | 90 | 3 | 95 | 90 | 90 | 93 | 95 |
| Hardness difference (Hs2 − Hs1) (°) | 0 | 5 | 8 | 10 | 0 | −5 | 3 | 5 |
| Second compression rubber layer, hardness (Hs3) (°) | 76 | 76 | 76 | 76 | 76 | 76 | 76 | 76 |
| Hardness difference (Hs2 − Hs3) (°) | 9 | 14 | 17 | 19 | 14 | 14 | 17 | 19 |
| Tension rubber layer, thickness (mm) | 0.8 | 0.8 | 0.8 | 0.8 | 0.8 | 0.8 | 0.8 | 0.8 |
| First compression rubber layer, thickness L2 (mm) | 2.6 | 2.6 | 2.6 | 2.6 | 2.6 | 2.6 | 2.6 | 2.6 |
| Compression rubber layer, thickness L1 (mm) | 3.6 | 3.6 | 3.6 | 3.6 | 3.6 | 3.6 | 3.6 | 3.6 |
| L2/L1 ratio | 72% | 72% | 72% | 72% | 72% | 72% | 72% | 72% |
| Overturn occurrence time (Hr) | 16 | 50 | 44 | 43 | 26 | 22 | 66 | 62 |
| Evaluation on overturn prevention property | D | A | B | B | D | D | A | A |

TABLE 7

|  | Example 6 | Example 7 | Example 4 | Example 8 | Example 9 |
|---|---|---|---|---|---|
| Tension rubber layer, hardness (Hs1) (°) | 90 | 90 | 90 | 90 | 90 |
| First compression rubber layer, hardness (Hs2) (°) | 93 | 93 | 93 | 93 | 93 |
| Hardness difference (Hs2 − Hs1) (°) | 3 | 3 | 3 | 3 | 3 |
| Second compression rubber layer, hardness (Hs3) (°) | 76 | 76 | 76 | 76 | 76 |
| Hardness difference (Hs2 − Hs3) (°) | 17 | 17 | 17 | 17 | 17 |
| Tension rubber layer, thickness (mm) | 0.8 | 0.8 | 0.8 | 0.8 | 0.8 |
| First compression rubber layer, thickness (mm) L2 | 1.4 | 1.8 | 2.6 | 3.2 | 3.4 |
| Compression rubber layer, thickness (mm) L1 | 3.6 | 3.6 | 3.6 | 3.6 | 3.6 |
| L2/L1 ratio | 39% | 50% | 72% | 89% | 94% |
| Overturn occurrence time (Hr) | 42 | 54 | 66 | 57 | 44 |
| Evaluation on overturn prevention property | B | A | A | A | B |

TABLE 8

|  | Example 10 | Example 11 | Example 12 | Example 2 |
|---|---|---|---|---|
| Tension rubber layer, hardness (Hs1) (°) | 85 | 85 | 85 | 85 |
| First compression rubber layer, hardness (Hs2) (°) | 93 | 93 | 93 | 93 |
| Hardness difference (Hs2 − Hs1) (°) | 8 | 8 | 8 | 8 |
| Second compression rubber layer, hardness (Hs3) (°) | 70 | 72 | 74 | 76 |
| Hardness difference (Hs2 − Hs3) (°) | 23 | 21 | 19 | 17 |
| Tension rubber layer, thickness (mm) | 0.8 | 0.8 | 0.8 | 0.8 |
| First compression rubber layer, thickness L2 (mm) | 2.6 | 2.6 | 2.6 | 2.6 |
| Compression rubber layer, thickness L1 (mm) | 3.6 | 3.6 | 3.6 | 3.6 |
| L2/L1 ratio | 72% | 72% | 72% | 72% |
| Overturn occurrence time (Hr) | 36 | 42 | 49 | 44 |
| Evaluation on overturn prevention property | C | B | B | B |

TABLE 9

|  | Example 4 | Example 13 | Example 14 | Example 15 |
|---|---|---|---|---|
| Tension rubber layer, hardness (Hs1) (°) | 90 | 90 | 90 | 90 |
| First compression rubber layer, hardness (Hs2) (°) | 93 | 93 | 93 | 93 |
| Hardness difference (Hs2 − Hs1) (°) | 3 | 3 | 3 | 3 |
| Second compression rubber layer, hardness (Hs3) (°) | 76 | 78 | 80 | 8 |
| Hardness difference (Hs2 − Hs3) (°) | 17 | 15 | 13 | 8 |
| Tension rubber layer, thickness (mm) | 0.8 | 0.8 | 0.8 | 0.8 |
| First compression rubber layer, thickness L2 (mm) | 2.6 | 2.6 | 2.6 | 2.6 |
| Compression rubber layer, thickness L1 (mm) | 3.6 | 3.6 | 3.6 | 3.6 |
| L2/L1 ratio | 72% | 72% | 72% | 72% |

TABLE 9-continued

|  | Example 4 | Example 13 | Example 14 | Example 15 |
|---|---|---|---|---|
| Overturn occurrence time (Hr) | 66 | 56 | 48 | 35 |
| Evaluation on overturn prevention property | A | A | B | C |

Examples 16 and 17 and Comparative Examples 4 and 5

A laminate composed of the reinforcing cloth precursor, the second compression rubber layer sheet shown in Table 10 and the first compression rubber layer sheet shown in Table 10 was cut and placed on the outer peripheral surface of a cylindrical drum, and then the adhesion rubber layer sheet, the cord and the tension rubber layer sheet shown in Table 10 were sequentially laminated and adhered thereto, to form a cylindrical unvulcanized sleeve in which the reinforcing cloth precursor, the unvulcanized rubber layers and the cord were laminated. Then, an unvulcanized belt molded body was formed therefrom in the same manner as in Example 1.

The obtained unvulcanized belt molded body was inserted into a concave groove of a ring mold. Then, in a state where a cylindrical rubber sleeve was fitted on the outer peripheral surface of the ring mold and the unvulcanized belt molded body, all parts were housed in a vulcanization can and vulcanized at a vulcanization temperature of 160° C., to obtain a vulcanized belt. The obtained vulcanized belt was removed from the ring mold to obtain a C type wrapped V-belt (JIS C, cross-sectional dimensions: width 16.5 mm×thickness 11.0 mm, belt length 162 inches). The average thickness of the outside cloth was 0.62 mm Table 10 shows the results of evaluation of the overturn prevention property of the obtained wrapped V-belts. The results of the overturn prevention property are illustrated in a graph in FIG. 8.

shear stress is generated inside the belt. In Example 6, buckling deformation was large and the overturn occurred relatively earlier.

On the other hand, in Example 9, since the hardness of the entire compression rubber layer was high, the fitting property to the pulley V groove was poor, causing the overturn easy to occur.

As is clear from the results shown in Tables 8 and 9, in Example 10 in which Hs2–Hs3 was large and Example 15 in which Hs2–Hs3 was small, the overturn occurred relatively earlier.

As is clear from the results shown in Table 10 and FIG. 8, a similar tendency was found with larger belts.

Although the present invention has been described in detail with reference to specific embodiments, it is obvious to those skilled in the art that various changes and modifications may be made without departing from the gist and the scope of the invention.

This application is based on Japanese Patent Application No. 2018-100328 filed on May 25, 2018, and Japanese Patent Application No. 2019-086123 filed on Apr. 26, 2019, contents of which are incorporated by reference herein.

INDUSTRIAL APPLICABILITY

The wrapped V-belt according to the present invention can be used for general industrial machinery such as a compressor, a generator and a pump, agricultural machinery such as a combine harvester, a rice transplanter and a mower, and the like, and is suitable for agricultural machinery

TABLE 10

|  | Comparative Example 4 | Comparative Example 5 | Example 16 | Example 17 |
|---|---|---|---|---|
| Tension rubber layer, hardness (Hs1) (°) | 90 | 95 | 90 | 90 |
| First compression rubber layer, hardness (Hs2) (°) | 90 | 90 | 93 | 95 |
| Hardness difference (Hs2 − Hs1) (°) | 0 | −5 | 3 | 5 |
| Second compression rubber layer, hardness (Hs3) (°) | 76 | 76 | 76 | 76 |
| Hardness difference (Hs2 − Hs3) (°) | 14 | 14 | 17 | 19 |
| Tension rubber layer, thickness (mm) | 1.0 | 1.0 | 1.0 | 1.0 |
| First compression rubber layer, thickness L2 (mm) | 3.2 | 3.2 | 3.2 | 3.2 |
| Compression rubber layer, thickness L1 (mm) | 4.4 | 4.4 | 4.4 | 4.4 |
| L2/L1 ratio | 73% | 73% | 73% | 73% |
| Overturn occurrence time (Hr) | 20 | 23 | 74 | 66 |
| Evaluation on overturn prevention property | D | D | A | A |

From the results shown in Tables 6 to 9 and FIG. 7, Example 4 showed the most excellent overturn prevention property. As is clear from the results shown in Table 6, in Comparative Examples in which Hs2–Hs1 was small, the overturn occurred earlier.

On the other hand, as is clear from the results shown in Table 7, Example 6 having a low L2/L1 ratio and Example 9 having a high L2/L1 ratio each had a result of a slightly poor overturn prevention property. A wrapped V-belt, which has a heavy load function in a large machine, is used with high tension in order to obtain high power transmission capacity. As a result, this wrapped V-belt falls into the pulley and a large deformation (buckling deformation) occurs, and having a multi-shaft layout in which continuous bending together with reverse bending is repeated and requiring high horsepower of 8 PS or more per belt.

REFERENCE SIGNS LIST 1, 11 wrapped V-belt
2, 12 tension rubber layer
3, 13 tension member
4, 14 tension member layer (adhesion rubber layer)
5a, 15a first compression rubber layer
5b, 15b second compression rubber layer
6, 16 outside cloth
17 reinforcing cloth layer

The invention claimed is:

1. A wrapped V-belt, comprising: a tension member layer comprising a tension member; a tension rubber layer laminated on the tension member layer at a belt outer peripheral side; a compression rubber layer laminated on the tension member layer at a belt inner peripheral side; and an outside cloth covering an entire outer surface of the belt,
    wherein the compression rubber layer comprises a first compression rubber layer laminated at the belt outer peripheral side and a second compression rubber layer laminated at the belt inner peripheral side, and
    the tension rubber layer has a rubber hardness that is higher than a rubber hardness of the second compression rubber layer and lower than a rubber hardness of the first compression rubber layer.

2. The wrapped V-belt according to claim 1, wherein the first compression rubber layer has an average thickness of from 90% to 50% with respect to an average thickness of the entire compression rubber layer.

3. The wrapped V-belt according to claim 1,
    wherein the tension rubber layer has the rubber hardness Hs (JIS A) in a range of from 85° to 90°,
    the first compression rubber layer has the rubber hardness Hs (JIS A) in the range of from 90° to 95°,
    the second compression rubber layer has the rubber hardness Hs (JIS A) in the range of from 72° to 80°,
    a difference in the rubber hardness Hs (JIS A) between the first compression rubber layer and the second compression rubber layer is from 12° to 21°, and
    a difference in the rubber hardness Hs (JIS A) between the first compression rubber layer and the tension rubber layer is from 3° to 10°.

4. The wrapped V-belt according to claim 1,
    wherein the difference in the rubber hardness Hs (JIS A) between the first compression rubber layer and the tension rubber layer is from 3° to 5°.

5. The wrapped V-belt according to claim 1,
    wherein the tension rubber layer has a tensile elastic modulus (modulus) in a belt width direction in accordance with JIS K6251 (1993) being from 17 MPa to 28 MPa,
    the first compression rubber layer has a tensile elastic modulus (modulus) in the belt width direction in accordance with JIS K6251 (1993) being from 30 MPa to 40 MPa, and
    the second compression rubber layer has a tensile elastic modulus (modulus) in the belt width direction in accordance with JIS K6251 (1993) being from 13 MPa to 18 MPa.

6. The wrapped V-belt according to claim 1,
    wherein the outside cloth serving as a power transmission surface has a coefficient of friction of from 0.91 to 0.96.

7. The wrapped V-belt according to claim 1, further comprising a reinforcing cloth layer interposed between an inner peripheral surface of the compression rubber layer and the outside cloth.

* * * * *